United States Patent
Suzuki et al.

(10) Patent No.: US 12,403,833 B2
(45) Date of Patent: Sep. 2, 2025

(54) VEHICLE DISPLAY CONTROL DEVICE AND DISPLAY CONTROL METHOD FOR PROCESSING AN IMAGE BASED ON A NUMBER OF LANES DETECTED

(71) Applicant: Panasonic Intellectual Property Management Co., Ltd., Osaka (JP)

(72) Inventors: Takayuki Suzuki, Kanagawa Ken (JP); Akitoshi Yamashita, Hyogo Ken (JP); Masayuki Yanagida, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 71 days.

(21) Appl. No.: 18/225,516

(22) Filed: Jul. 24, 2023

(65) Prior Publication Data

US 2023/0365064 A1 Nov. 16, 2023

Related U.S. Application Data

(63) Continuation of application No. PCT/JP2021/037777, filed on Oct. 12, 2021.

(30) Foreign Application Priority Data

Feb. 18, 2021 (JP) ................................ 2021-024671

(51) Int. Cl.
*B60R 1/27* (2022.01)
(52) U.S. Cl.
CPC .......... *B60R 1/27* (2022.01); *B60R 2300/202* (2013.01); *B60R 2300/302* (2013.01); *B60R 2300/804* (2013.01)
(58) Field of Classification Search
CPC ................ B60R 1/27; B60R 2300/202; B60R 2300/302; B60R 2300/804; B60R 1/00;
(Continued)

(56) References Cited

U.S. PATENT DOCUMENTS 6,075,559 A 6/2000 Harada
10,922,963 B2 * 2/2021 Horita ................. G08G 1/0145
(Continued)

FOREIGN PATENT DOCUMENTS

JP 11-150726 6/1999
JP 2000182180 A * 6/2000
(Continued)

OTHER PUBLICATIONS

International Search Report (ISR) from International Searching Authority (Japan Patent Office) in International Pat. Appl. No. PCT/JP2021/037777, dated Dec. 21, 2021, together with an English language translation.

*Primary Examiner* — Richard A Hansell, Jr.
(74) *Attorney, Agent, or Firm* — Greenblum and Bernstein, P.L.C.

(57) ABSTRACT

A display control device includes a memory that stores therein a program; and a processor that is connected to the memory. The processor performs processing by executing the program. The processing includes: detecting a number of lanes indicating the number of one or more lanes including a lane on which a host vehicle travels; determining a processing condition for an area other than an essential display area indicating a predefined display area in a captured image obtained by imaging surroundings of the host vehicle, according to the number of lanes detected; and controlling that includes processing the captured image according to the processing condition determined and displaying the processed captured image on a display device.

16 Claims, 14 Drawing Sheets

(58) Field of Classification Search
CPC .. G08G 1/16; G09G 5/00; G09G 5/36; H04N 7/18

See application file for complete search history.

(56) References Cited

U.S. PATENT DOCUMENTS

| | | | | |
|---|---|---|---|---|
| 11,124,128 | B2* | 9/2021 | Inoue | B60R 1/27 |
| 2010/0290522 | A1* | 11/2010 | Otani | H04N 19/164 |
| | | | | 375/E7.154 |
| 2011/0267452 | A1* | 11/2011 | Notsu | H04N 19/115 |
| | | | | 382/104 |
| 2016/0059781 | A1* | 3/2016 | Tatara | B60R 1/26 |
| | | | | 348/148 |
| 2017/0129405 | A1* | 5/2017 | Oba | B60R 1/12 |
| 2018/0370439 | A1* | 12/2018 | Katsuyama | H04N 7/18 |
| 2020/0278685 | A1* | 9/2020 | Jang | B60W 50/082 |
| 2020/0307456 | A1* | 10/2020 | Michiguchi | G06T 3/00 |
| 2020/0348665 | A1* | 11/2020 | Bhanushali | H04N 19/167 |
| 2021/0009036 | A1 | 1/2021 | Kosugi et al. | |

FOREIGN PATENT DOCUMENTS

| | | |
|---|---|---|
| JP | 2001-116567 | 4/2001 |
| JP | 2010-095086 | 4/2010 |
| JP | 2011-079338 | 4/2011 |
| JP | 2016-048839 | 4/2016 |
| JP | 2018-006936 | 1/2018 |
| JP | 2019-116220 | 7/2019 |
| JP | 2019-145982 | 8/2019 |
| WO | 2010/095206 | 8/2010 |

\* cited by examiner

VEHICLE DISPLAY CONTROL DEVICE AND DISPLAY CONTROL METHOD FOR PROCESSING AN IMAGE BASED ON A NUMBER OF LANES DETECTED

CROSS-REFERENCE TO RELATED APPLICATIONS

This application is a continuation of International Application No. PCT/JP2021/037777, filed on Oct. 12, 2021 which claims the benefit of priority of the prior Japanese Patent Application No. 2021-024671, filed on Feb. 18, 2021, the entire contents of which are incorporated herein by reference.

FIELD

The present disclosure relates to a display control device and a display control method.

BACKGROUND

In recent years, more and more vehicles have been equipped with an electronic mirror that captures image surroundings of the host vehicle with a camera and displays the captured image on a display device. The surroundings of the host vehicle are, for example, an area behind the host vehicle. However, similar to rearward check with an optical mirror, the image displayed on the electronic mirror may have a blind spot laterally behind. Thus, a driver still needs direct check by his/her eyes to check for any vehicle or the like present laterally behind. Therefore, the driver may tend to pay less attention to the front, for example, during a lane change or the like.

To address this, a technique has been proposed that captures, using a camera, an image of an area exceeding a range visible with an optical mirror as an area behind the vehicle, and displays the captured image by compressing the captured image such that the compression ratio in the vehicle width direction gradually increases from the inside of the vehicle outward on a display device (refer to, for example, JP 2019-145982 A).

However, in the conventional technique, the driver may have difficulty in viewing the area displaying laterally behind the host vehicle because the area has a high compression ratio. Thus, when the driver performs a lane change or the like, he/she may overlook a vehicle present laterally behind.

SUMMARY

The present disclosure has been made in view of the above, and an object thereof is to make it easier to view a vehicle present laterally behind.

An aspect of the present invention provides a display control device including a memory that stores therein a program; and a processor that is connected to the memory. The processor performs processing by executing the program. The processing includes: detecting a number of lanes indicating the number of one or more lanes including a lane on which a host vehicle travels; determining a processing condition for an area other than an essential display area indicating a predefined display area in a captured image obtained by imaging surroundings of the host vehicle, according to the number of lanes detected; and controlling that includes processing the captured image according to the processing condition determined and displaying the processed captured image on a display device.

Another aspect of the present invention provides a display control method performed by a display control device. The method includes: detecting a number of lanes indicating the number of one or more lanes including a lane on which a host vehicle travels; determining a processing condition for an area other than an essential display area indicating a predefined display area in a captured image obtained by imaging surroundings of the host vehicle according to the number of lanes detected; and controlling that includes processing the captured image according to the processing condition determined and displaying the processed captured image on a display device.

DETAILED DESCRIPTION

Hereinafter, embodiments of a display control device and a display control method according to the present disclosure will be described with reference to the drawings.

First Embodiment

Configuration Example of Vehicle

Figure 1:
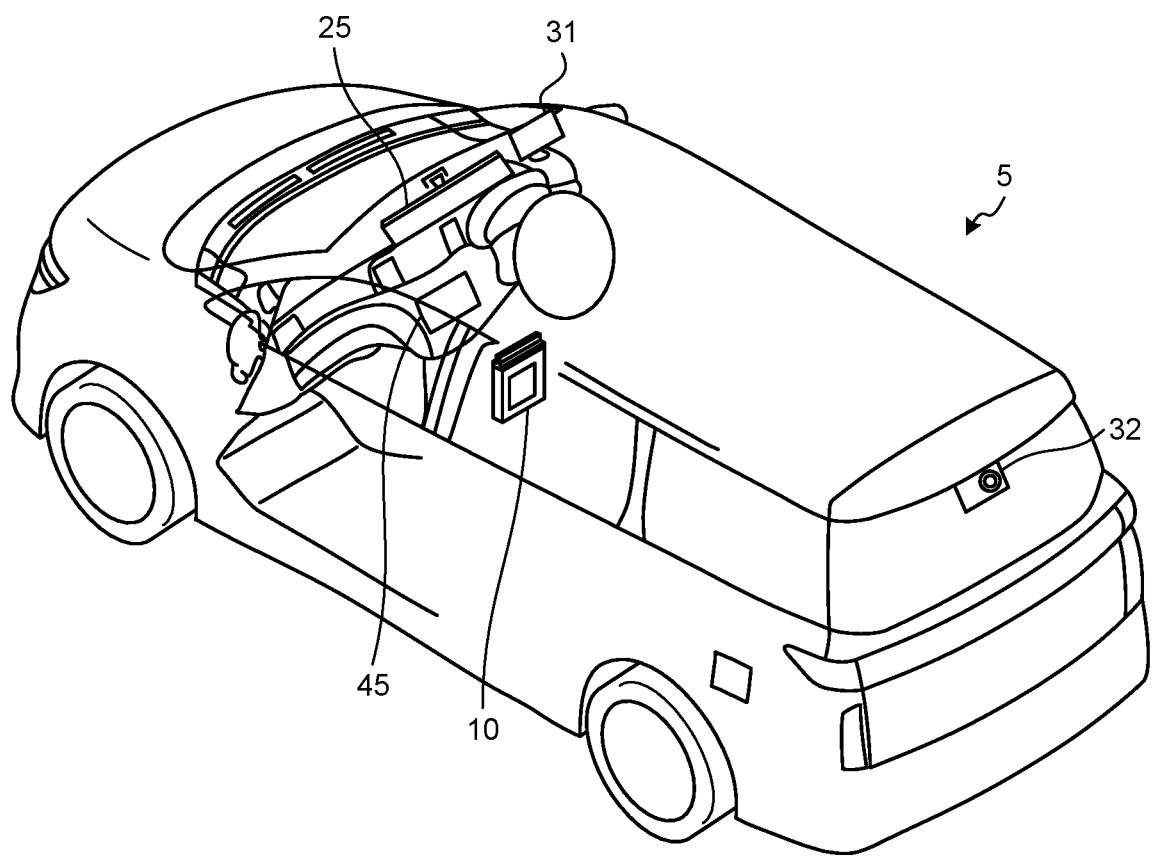
FIG. 1 is a schematic diagram illustrating an example of a vehicle including a drive recorder unit according to a first embodiment.

FIG. 1 is a schematic diagram illustrating an example of a vehicle 5 including a drive recorder unit 10 according to a first embodiment. As illustrated in FIG. 1, the vehicle 5 according to the first embodiment includes, for example, the drive recorder unit 10, a rear camera 32, and a display device 25. The vehicle 5 may include a front camera 31 and a display 45. Hereinafter, an example in which the vehicle 5 includes the front camera 31 and the display 45 will be described.

The front camera 31 is disposed, for example, on a windshield of the vehicle 5. The front camera 31 images the outside of the vehicle 5, and generates a front view image signal. The front camera 31 images, for example, an area ahead of the vehicle 5. The front view image signal includes, for example, information of a front view image. The front view image is, for example, a video image of the area ahead of the vehicle 5 captured by the front camera 31.

The rear camera 32 is disposed, for example, on the rear windshield of the vehicle 5. The rear camera 32 images the outside of the vehicle 5, and generates a rear view image signal. The rear camera 32 images, for example, an area behind the vehicle 5. The rear camera 32 may be capable of wide-angle shooting. The rear view image signal includes, for example, information of a rear view image. The rear view image is, for example, a video image of the area behind the vehicle 5 captured by the rear camera 32 capable of wide-angle shooting.

The drive recorder unit 10 is housed, for example, in a console box of the vehicle 5. Processing of the drive recorder unit 10 will be described later. The drive recorder unit 10 is an example of the display control device.

The display device 25 displays the area behind the vehicle 5. The display device 25 displays, for example, the rear view image of the vehicle 5. The display device 25 is, for example, a liquid crystal display. The display device 25 may be, for example, a mirror type display device imitating a mirror for checking the area behind the vehicle 5. The display device 25 is, for example, an electronic mirror.

The display device 25 displays, for example, the rear view image processed in a predetermined manner by an electronic control unit (ECU) formed integrally with the display device 25. In the present embodiment, the display device 25 is an electronic mirror in the form of a rearview mirror.

Although the display device 25 is described in FIG. 1 as the electronic mirror in the form of a rearview mirror, the display device 25 may be another type of electronic mirror for rearward check when the display device 25 is an electronic mirror. The display device 25 may be, for example, an electronic mirror having the form of a door mirror or a fender mirror.

The display 45 displays information on the vehicle 5. The display 45 displays, for example, the front view image of the vehicle 5. The display 45 is, for example, a liquid crystal display. The display 45 may be, for example, a panel-type liquid crystal display fitted into an instrument panel or the like.

The display 45 may display an image of another camera (not illustrated) provided on a side surface, in a cabin, or the like of the vehicle 5. In addition, the display 45 may display an image that combines images of a plurality of cameras that image the outside of the vehicle, including the front camera 31 and the rear camera 32. The image that combines the images of the plurality of cameras is, for example, an omnidirectional bird's-eye view image.

Configuration Example of Display Control System

Figure 2:
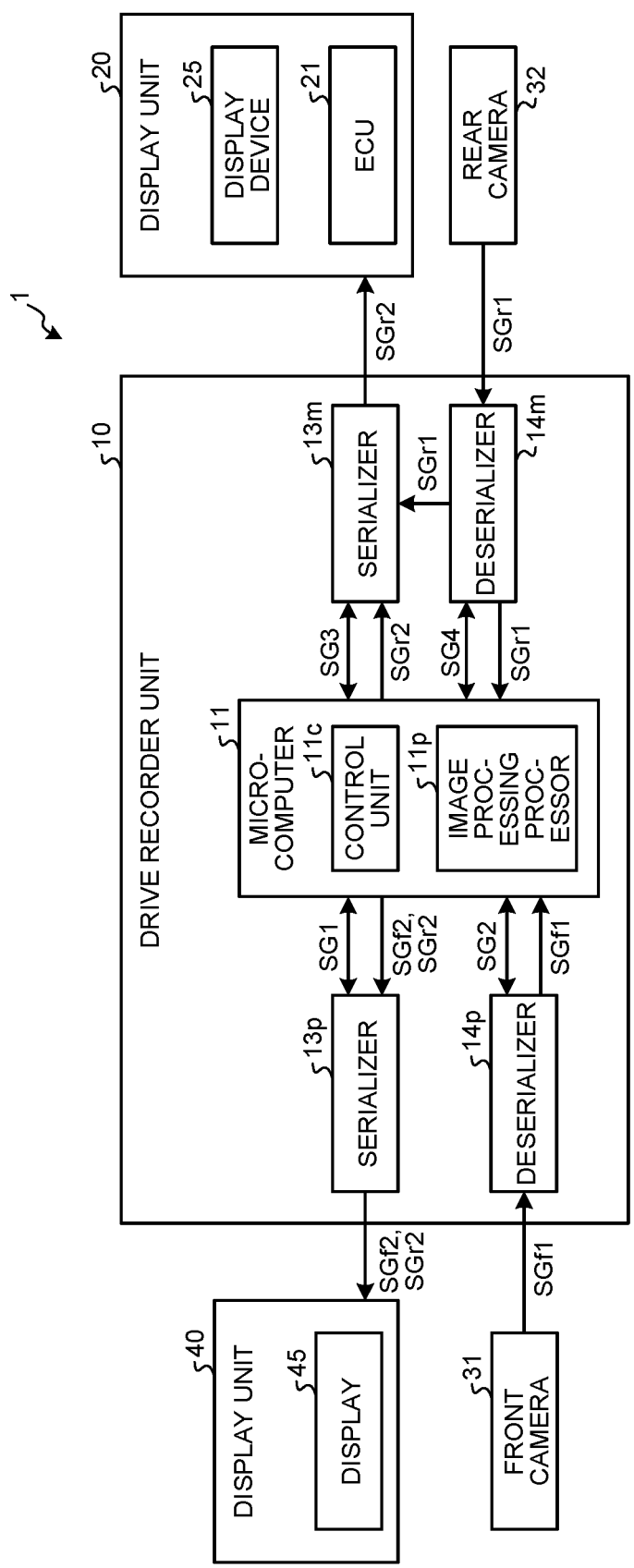
FIG. 2 is a block diagram illustrating an example of a configuration of a display control system according to the first embodiment.

FIG. 2 is a block diagram illustrating an example of a configuration of a display control system 1 according to the first embodiment.

As illustrated in FIG. 2, the display control system 1 according to the first embodiment includes the drive recorder unit 10, a display unit 20, and the rear camera 32. The display control system 1 of the first embodiment is configured to be mountable on, for example, the above-described vehicle 5. The display control system 1 may include the front camera 31 and a display unit 40. Hereinafter, an example in which the display control system 1 includes the front camera 31 and the display unit 40 will be described.

The drive recorder unit 10 includes a microcomputer 11, a serializer 13m, and a deserializer 14m. The drive recorder unit 10 may include a serializer 13p and a deserializer 14p. Hereinafter, an example in which the drive recorder unit 10 includes the serializer 13p and the deserializer 14p will be described.

The microcomputer 11 is a computer including, for example, a central processing unit (CPU), a read only memory (ROM), and a random access memory (RAM). The microcomputer 11 is configured as a system on chip (SoC) including, for example, an image processing processor 11p and a control unit 11c. The control unit 11c controls the image processing processor 11p.

The microcomputer 11 can control the serializer 13m by transmitting a control signal SG3 to the serializer 13m. The microcomputer 11 also can control the deserializer 14m by transmitting a control signal SG4 to the deserializer 14m.

The microcomputer 11 controls the serializer 13p by transmitting a control signal SG1 to the serializer 13p. The microcomputer 11 also controls the deserializer 14p by transmitting a control signal SG2 to the deserializer 14p. Specifically, the control unit 11c controls the serializer 13m, the deserializer 14m, the serializer 13p, and the deserializer 14p by transmitting the respective control signals.

When a video signal SGr1 is transmitted as a rear view image signal from the rear camera 32, the microcomputer 11 transmits the control signal SG4 to the deserializer 14m to cause the deserializer 14m to receive the video signal SGr1 from the rear camera 32. The video signal SGr1 received by the deserializer 14m is, for example, a serialized video signal.

Upon receiving the control signal SG4 from the microcomputer 11, the deserializer 14m receives the video signal SGr1 transmitted from the rear camera 32. The deserializer 14m transmits the video signal SGr1 to the microcomputer 11 and the serializer 13m. The deserializer 14m may transmit the received video signal SGr1 after converting the video signal SGr1 into parallel data.

When a video signal SGf1 is transmitted as a front view image signal from the front camera 31, the microcomputer 11 transmits the control signal SG2 to the deserializer 14p to cause the deserializer 14p to receive the video signal SGf1 from the front camera 31. The video signal SGf1 received by the deserializer 14p is, for example, a serialized video signal.

Upon receiving the control signal SG2 from the microcomputer 11, the deserializer 14p receives the video signal SGf1 transmitted from the front camera 31. The deserializer 14p transmits the video signal SGf1 to the microcomputer 11. The deserializer 14p may transmit the received video signal SGf1 after converting the video signal SGf1 into parallel data.

The microcomputer 11 receives the rear view image signal generated by the rear camera 32 from the deserializer 14m as the video signal SGr1. Specifically, the image processing processor 11p receives the video signal SGr1 from the deserializer 14m.

The image processing processor 11p performs, for example, image processing such as cutout processing and compression processing described later on the video signal SGr1 to generate a video signal SGr2. The video signal SGr2 is a signal for displaying the rear view image subjected to the image processing.

The image processing processor 11p transmits the video signal SGr2 to the serializer 13m. In other words, the microcomputer 11 transmits the video signal SGr2 to the serializer 13m. The microcomputer 11 may transmit the video signal SGr2 to the serializer 13m after converting the video signal SGr2 into parallel data.

The microcomputer 11 receives the front view image signal generated by the front camera 31 from the deserializer 14p as the video signal SGf1. Specifically, the image processing processor 11p receives the video signal SGf1 from the deserializer 14p.

The image processing processor 11p performs, for example, image processing such as adjustment of color and contrast on the video signal SGf1 to generate a video signal SGf2. The image processing processor 11p transmits the video signal SGf2 and the video signal SGr2 to the serializer 13p.

In other words, the microcomputer 11 transmits the video signal SGf2 and the video signal SGr2 to the serializer 13p. The microcomputer 11 may transmit the video signal SGf2 and the video signal SGr2 to the serializer 13p after converting the video signals SGf2 and SGr2 into parallel data.

Upon receiving the control signal SG3 from the microcomputer 11, the serializer 13m transmits the video signal SGr2 received from the microcomputer 11 to the display unit 20. For example, when receiving the video signal SGr2 converted into parallel data from the microcomputer 11, the serializer 13m may transmit the video signal SGr2 after converting the video signal SGr2 into serial data.

The microcomputer 11 controls the serializer 13p to transmit the video signal SGf2 and the video signal SGr2 to the display unit 40 by transmitting the control signal SG1.

Upon receiving the control signal SG1 from the microcomputer 11, the serializer 13p transmits the video signal SGf2 and the video signal SGr2 received from the microcomputer 11 to the display unit 40. For example, when receiving the video signal SGf2 and the video signal SGr2 converted into parallel data from the microcomputer 11, the serializer 13p may transmit the video signal SGf2 after converting the video signals SGf2 and SGr2 into serial data.

The transmission of the control signal SG1 to the serializer 13p, the transmission of the control signal SG2 to the deserializer 14p, the transmission of the control signal SG3 to the serializer 13m, and the transmission of the control signal SG4 to the deserializer 14m from the microcomputer 11 are performed in, for example, an inter-integrated circuit (I2C) format.

In addition, the transmission of the video signal SGf1 from the deserializer 14p to the microcomputer 11, the transmission of the video signal SGf2 and the video signal SGr2 from the microcomputer 11 to the serializer 13p, the transmission of the video signal SGr1 from the deserializer 14m to the microcomputer 11, and the transmission of the video signal SGr2 from the microcomputer 11 to the serializer 13m are performed in, for example, a mobile industry processor interface (MIPI) format.

Furthermore, the transmission of the video signal SGr1 from the rear camera 32 to the deserializer 14m, the transmission of the video signal SGr2 from the serializer 13m to the display unit 20, the transmission of the video signal SGf1 from the front camera 31 to the deserializer 14p, and the transmission of the video signal SGf2 and the video signal SGr2 from the serializer 13p to the display unit 40 are performed in, for example, a flat panel display-link III (FPD-Link III) format.

These video transmissions may be performed by wired communication or wireless communication. For example, the video transmission may be performed by wired communication using a coaxial cable. For example, the video transmission may be performed by wireless communication using Wi-Fi (registered trademark).

The display unit 40 includes the display 45. The display unit 40 is configured as a part of an in-vehicle infotainment (IVI) system, for example.

The display unit 40 transmits the received video signal SGf2 and video signal SGr2 to the display 45. The display 45 can display the front view image based on the received video signal SGf2. In addition, the display 45 can display the rear view image based on the received video signal SGr2.

The display unit 20 includes a display device 25. The display unit 20 may include an electronic control unit (ECU) 21. Hereinafter, an example in which the display unit 20 includes the ECU 21 will be described. The ECU 21 is, for example, a computer including a CPU, a ROM, and a RAM.

The display unit 20 transmits the received video signal SGr2 to the ECU 21. The ECU 21 performs image processing on the video signal SGr2. The image processing is, for example, adjustment of color and contrast performed so as to be suitable for display on the display device 25.

The video signal SGr2 subjected to the image processing by the ECU 21 is delivered to the display device 25. The display device 25 displays the rear view image that is a video image generated based on the video signal SGr2.

Functional Configuration of Drive Recorder Unit of First Embodiment

Figure 3:
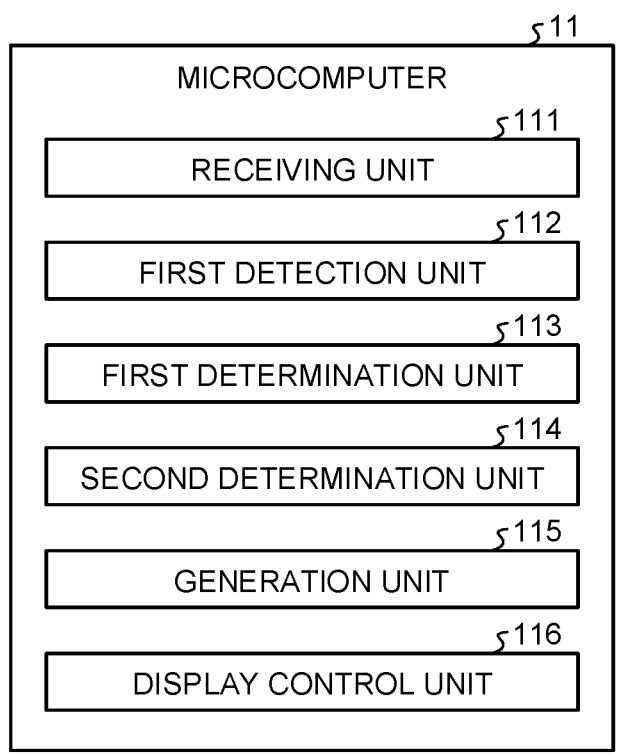
FIG. 3 is a functional block diagram illustrating an example of a functional configuration of a microcomputer of the drive recorder unit according to the first embodiment.

Next, a functional configuration of the drive recorder unit 10 according to the first embodiment will be described with reference to FIG. 3. FIG. 3 is a functional block diagram illustrating an example of a functional configuration of the microcomputer 11 of the drive recorder unit 10 according to the first embodiment.

The microcomputer 11 of the drive recorder unit 10 loads a control program stored in the ROM of the microcomputer 11 to the RAM and causes the CPU and the image processing processor 11p to operate, thereby implementing a receiving unit 111, a first detection unit 112, a first determination unit 113, a second determination unit 114, a generation unit 115, and a display control unit 116 illustrated in FIG. 3 as functional units. This may be referred to as the drive recorder unit 10 including the receiving unit 111, the first detection unit 112, the first determination unit 113, the second determination unit 114, the generation unit 115, and the display control unit 116. The receiving unit 111, the first detection unit 112, the first determination unit 113, the second determination unit 114, the generation unit 115, and the display control unit 116 may be implemented by different hardware.

The receiving unit 111 receives a captured image obtained by imaging an area around a host vehicle including the area laterally behind the host vehicle. In the present disclosure, "receiving" includes receiving transmitted information, signals, images, and the like. Specifically, the receiving unit 111 receives the rear view image generated by the rear camera 32. For example, the receiving unit 111 receives the video signal SGr1. In addition, the receiving unit 111 receives the front view image generated by the front camera 31. For example, the receiving unit 111 receives the video signal SGf1.

Figure 4:
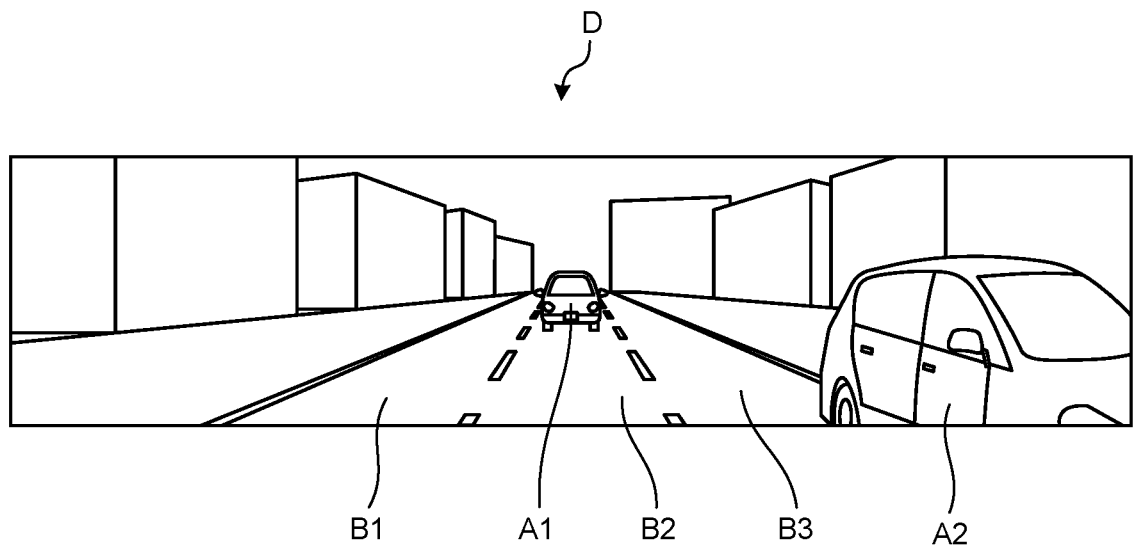
FIG. 4 is a view illustrating an example of a rear view image of the host vehicle according to the first embodiment.

FIG. 4 is a view illustrating an example of a rear view image of the host vehicle captured by the rear camera 32 according to the first embodiment. In a rear view image D illustrated in FIG. 4, a vehicle A1, a vehicle A2, a lane B1, a lane B2, and a lane B3 are drawn. In this example, the rear view image D is an image obtained by imaging the area behind the host vehicle traveling in the lane B2 using the wide-angle rear camera 32. The vehicle A1 is traveling on the lane B2 as the host vehicle does, and the vehicle A2 is traveling in the left lane B3 adjacent to the host vehicle.

The first detection unit 112 detects the number of lanes indicating the number of one or more lanes including the lane on which the host vehicle travels. Note that the number of lanes herein indicates the total number of lanes on which vehicles travel and sidewalks on which pedestrians walk. In other words, a lane includes a driving lane and a sidewalk.

Specifically, the first detection unit 112 detects the number of lanes by detecting a lane change line, a boundary between a roadway and a sidewalk, or the like from the rear view image received by the receiving unit 111. The rear view image is an example of the captured image. The boundary between the roadway and the sidewalk is, for example, a curb. For example, in the example of FIG. 4, since there are three lanes of the lane B1, lane B2, and lane B3, the first detection unit 112 detects that the number of lanes is "3".

The first detection unit 112 may count the number of lanes excluding the number of lanes for a vehicle traveling in the opposite direction to the host vehicle. Hereinafter, a lane for a vehicle traveling in the opposite direction to the host vehicle may be referred to as an opposite lane.

Examples of a method of determining the opposite lane include detecting a median strip or a center line in the rear view image and determining whether or not the lane is the opposite lane from a positional relationship between the median strip or the center line and the lane. Alternatively, for example, it may be determined whether or not the lane is the opposite lane from the traveling direction of the vehicle traveling in the lane in the rear view image.

Alternatively, for example, it may be determined whether or not the lane is the opposite lane by receiving information on the lane based on a reception result of a positioning signal that is transmitted from an artificial satellite in the sky and is a signal indicating the position of the vehicle 5.

Alternatively, for example, it may be determined whether or not the lane is the opposite lane by performing vehicle-to-roadside-infrastructure communication with a device installed on the road and receiving information on the lane.

Although, in the present embodiment, the first detection unit 112 detects the number of lanes from the captured image received by the receiving unit 111, the first detection unit 112 may detect the number of lanes based on the reception result of a positioning signal.

Alternatively, the first detection unit 112 may detect the number of lanes by performing vehicle-to-roadside-infrastructure communication and receiving information on the roads.

The first determination unit 113 determines the cutout area according to the number of lanes detected by the first detection unit 112. The first determination unit 113 is an example of the determination unit. The cutout area is an area of the captured image to be displayed on the display device 25. The determination of the cutout area is an example of processing conditions.

Specifically, the first determination unit 113 first determines an essential display area indicating a predefined area in the rear view image received by the receiving unit 111. The essential display area is determined by the first determination unit 113 according to predefined conditions.

In principle, the conditions for determining the essential display area may be freely set as long as they satisfy the provisions regarding the field of vision of Regulation 46 defined by the United Nations (UN-R46: United Nations-Regulation 46).

The provisions regarding the field of vision of UN-R46 are: "The field of vision shall be such that the driver can see at least a 20-m wide, flat, horizontal portion of the road centered on the vertical longitudinal median plane of the vehicle and extending from 60 m behind the driver's ocular points to the horizon".

Figure 5:
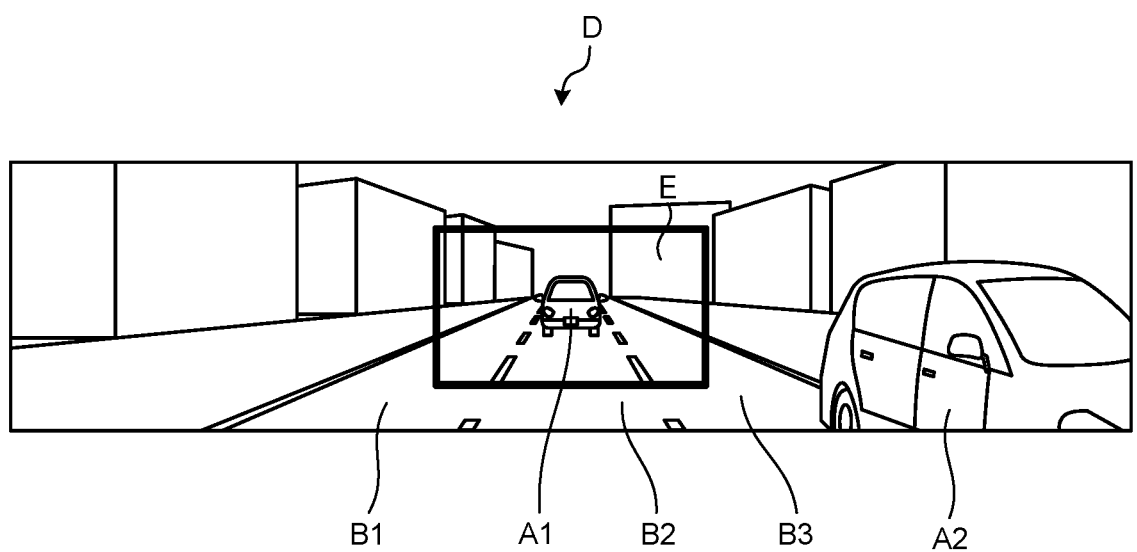
FIG. 5 is an image view illustrating an example of processing of determining an essential display area according to the first embodiment.

FIG. 5 is an image view illustrating an example of processing of determining the essential display area according to the first embodiment. As illustrated in FIG. 5, the first determination unit 113 determines a predefined area (an area in a black frame) in the rear view image D as an essential display area E.

After determining the essential display area E, the first determination unit 113 determines the cutout area including the essential display area E according to the number of lanes detected by the first detection unit 112. For example, the first determination unit 113 determines the cutout area centered on the essential display area E based on a table that associates the number of lanes detected by the first detection unit 112 with the size of the cutout area.

In principle, the larger the number of lanes is, the larger the cutout area is, and the smaller the number of lanes is, the smaller the cutout area is. However, since the cutout area may be too large if the number of lanes is too large, the first determination unit 113 may determine the upper limit of the size of the cutout area such that the size does not exceed the upper limit.

Figure 6:
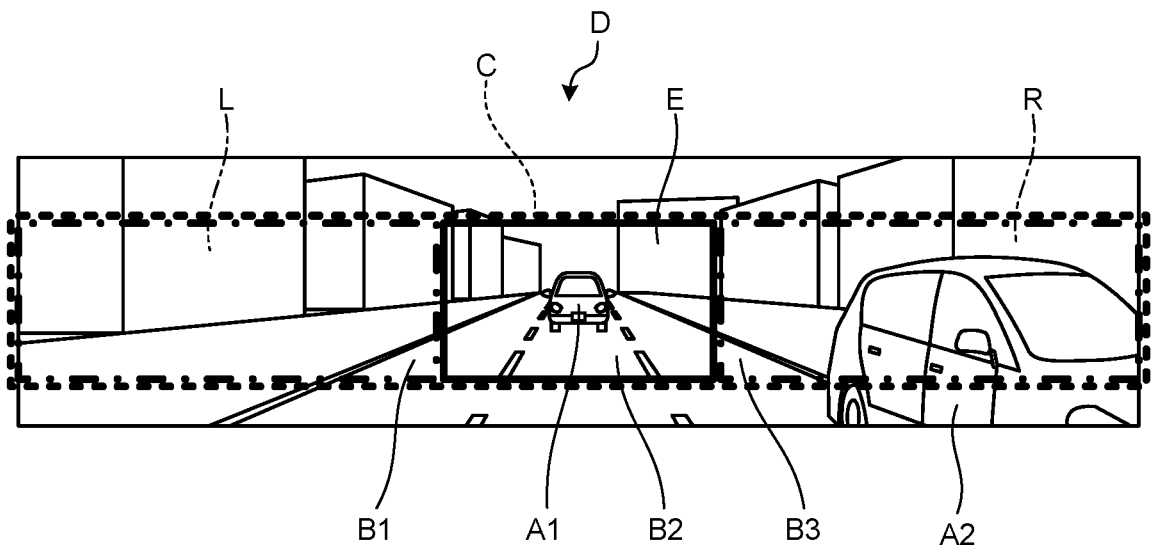
FIG. 6 is an image view illustrating an example of processing of determining a cutout area according to the first embodiment.

FIG. 6 is an image view illustrating an example of processing of determining the cutout area according to the first embodiment. First, the first determination unit 113 determines the size of the cutout area corresponding to the number of lanes "3" detected by the first detection unit 112. Then, as illustrated in FIG. 6, the first determination unit 113 determines a cutout area C centered on the essential display area E.

The cutout area C includes the essential display area E, a left area L located to the left of the essential display area E in the image, and a right area R located to the right of the essential display area E in the image.

Returning to FIG. 3, the description will be continued. The second determination unit 114 determines processing conditions for an area other than the essential display area in the cutout area of the captured image obtained by imaging the surroundings of the host vehicle, according to the number of lanes detected by the first detection unit 112. Hereinafter, the area other than the essential display area in the cutout area of the captured image may be referred to as a compression target area. The second determination unit 114 is an example of the determination unit. The second determination unit 114 may also function as the above-described first determination unit 113. Alternatively, the first determination unit 113 may also function as the second determination unit 114.

The second determination unit 114 determines the compression ratio of the display in the vehicle width direction for the compression target area in the cutout area, according to the number of lanes detected by the first detection unit 112. In the example of FIG. 6, the compression target area is the left area L and the right area R. The compression ratio of the display in the vehicle width direction indicates how much the captured image is compressed in the vehicle width direction to be displayed.

For example, the second determination unit 114 determines the compression ratio of the compression target area in the cutout area based on a table that associates the number of lanes detected by the first detection unit 112 with the compression ratio.

In principle, the larger the number of lanes is, the higher the compression ratio is, and the smaller the number of lanes is, the lower the compression ratio is. However, since the compression ratio may be too high if the number of lanes is too large, the second determination unit 114 may determine the upper limit of the compression ratio such that the compression ratio does not exceed the upper limit.

In the example of FIG. 6, the second determination unit 114 determines the compression ratio corresponding to the number of lanes "3" detected by the first detection unit 112 as the compression ratios of the left area L and the right area R. The second determination unit 114 determines to compress the left area L and the right area R such that their dimensions in the vehicle width decrease to half, for example.

Returning to FIG. 3, the description will be continued. The generation unit 115 generates a display image to be displayed on the display device by processing the captured image according to the processing conditions determined by the first determination unit 113 and the second determination unit 114.

Specifically, the generation unit 115 first cuts out the cutout area C determined by the first determination unit 113 from the rear view image D. Next, the generation unit 115 performs compression processing on the left area L and the right area R of the cutout area C according to the compression ratio determined by the second determination unit 114, and generates a display image to be displayed on the display device 25. For example, the generation unit 115 performs the processing of compressing the left area L and the right area R such that their dimensions in the vehicle width decrease to half. The display image here is, for example, an image displayed based on the video signal SGr2.

In addition, the generation unit 115 performs image processing such as adjustment of color and contrast on the front view image received by the receiving unit 111, and generates a display image. The display image here is, for example, an image displayed based on the video signal SGf2.

The display control unit 116 performs control to processes the captured image according to the processing conditions determined by the first determination unit 113 and the second determination unit 114, and display the captured image on the display device. Specifically, the display control unit 116 performs control to display the display image generated by the generation unit 115 on the display device 25. In addition, the display control unit 116 performs control to display the display image generated by the generation unit 115 on the display 45.

Figure 7:
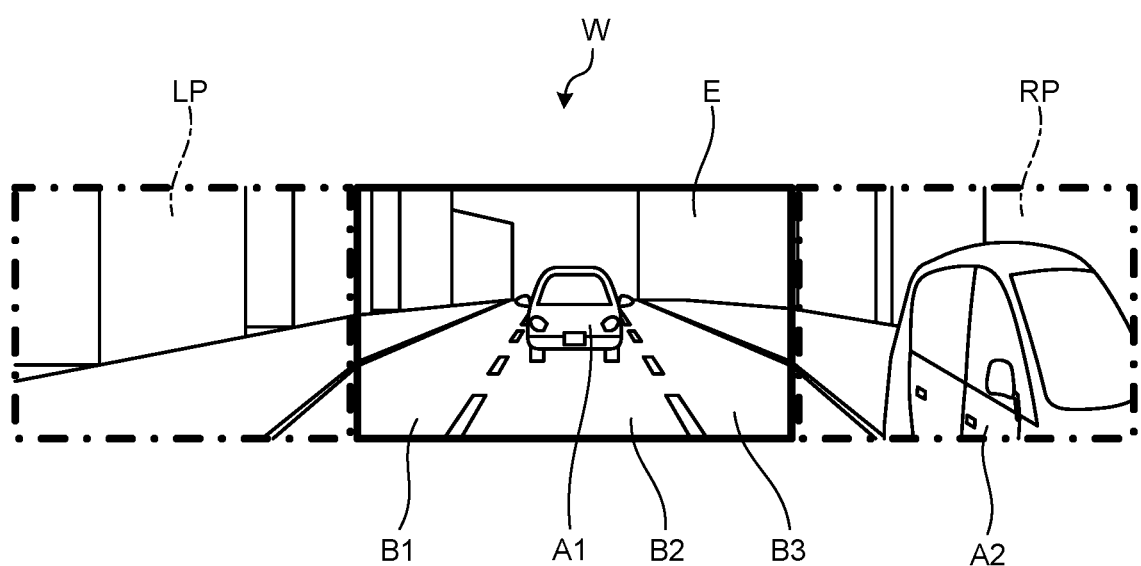
FIG. 7 is a view illustrating an example of a display image according to the first embodiment.

FIG. 7 is an example of the display image displayed on the display device 25 according to the first embodiment. In the example of FIG. 7, a display image W includes a left compression area LP, the essential display area E, and a right compression area RP. The essential display area E is displayed on the display device 25 at the same scale as that in the rear view image D by the display control unit 116.

The left compression area LP is an area obtained by compressing the left area L of the cutout area C in FIG. 6 such that its dimension in the vehicle width decreases to half. The right compression area RP is an area obtained by compressing the right area R of the cutout area C in FIG. 6 such that its dimension in the vehicle width decreases to half. Note that the frames such as the black frame in FIG. 7 are drawn for convenience of description, and no frame is displayed in the actual display image W displayed on the display device 25.

Although, in the above example, the second determination unit 114 determines to compress the compression target area of the cutout area C at the fixed compression ratio to decrease its dimension in the vehicle width direction to half, the compression ratio may vary depending on the position in the compression area. For example, the second determination unit 114 may determine the compression ratio such that the compression ratio of the compression area increases in a phased manner, as it goes outward from the center of the cutout area C.

Figure 8:
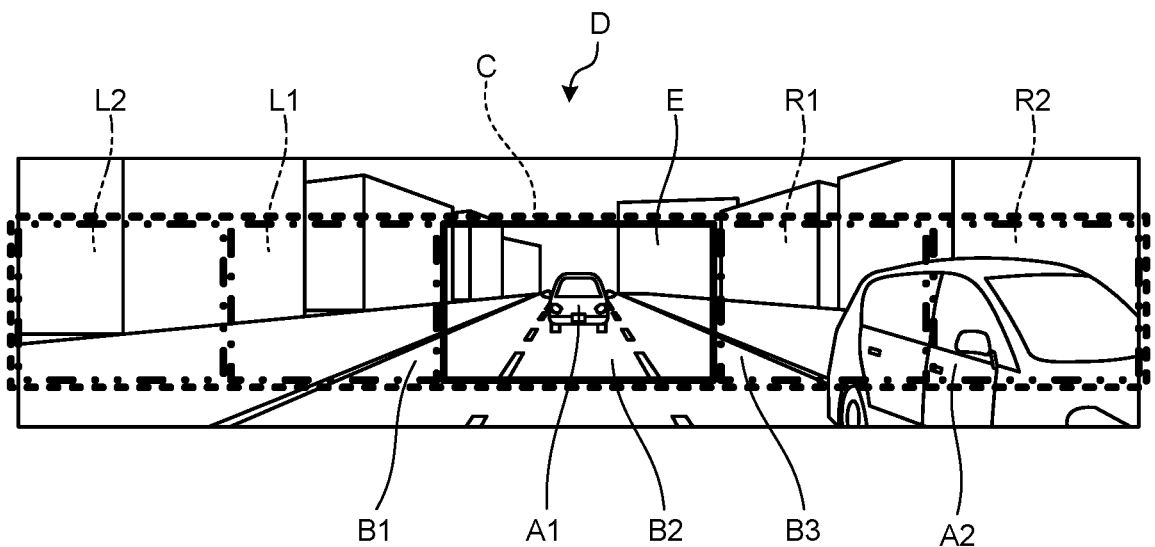
FIG. 8 is an image view illustrating an example of a cutout area before compression in a case where a compression ratio is changed depending on a position in a compression area according to the first embodiment.

FIG. 8 is an image view illustrating an example of the cutout area before compression in a case where the compression ratio is changed depending on the position in the compression area according to the first embodiment. In the example of FIG. 8, the cutout area C includes a first left area L1, a second left area L2, the essential display area E, a first right area R1, and a second right area R2. The first detection unit 112 and the first determination unit 113 perform the same processing as that described with reference to FIGS. 5 and 6.

The second determination unit 114 determines the compression ratio corresponding to the number of lanes "3" detected by the first detection unit 112. For example, the second determination unit 114 determines to compress the first left area L1 and the first right area R1 such that their dimensions in the vehicle width direction decrease to half, and compress the second left area L2 and the second right area R2 such that their dimensions in the vehicle width direction decrease to quarter.

The generation unit 115 cuts out the cutout area C according to the determination of the first determination unit 113. Then, the generation unit 115 performs the compression processing according to the compression ratios determined by the second determination unit 114 by compressing the first left area L1 and the first right area R1 in the cutout area C such that their dimensions in the vehicle width direction decrease to half and by compressing the second left area L2 and the second right area R2 such that their dimensions in the vehicle width direction decrease to quarter. The generation unit 115 then generates the display image W to be displayed on the display device 25. The display control unit 116 displays the display image W generated by the generation unit 115 on the display device 25.

Figure 9:
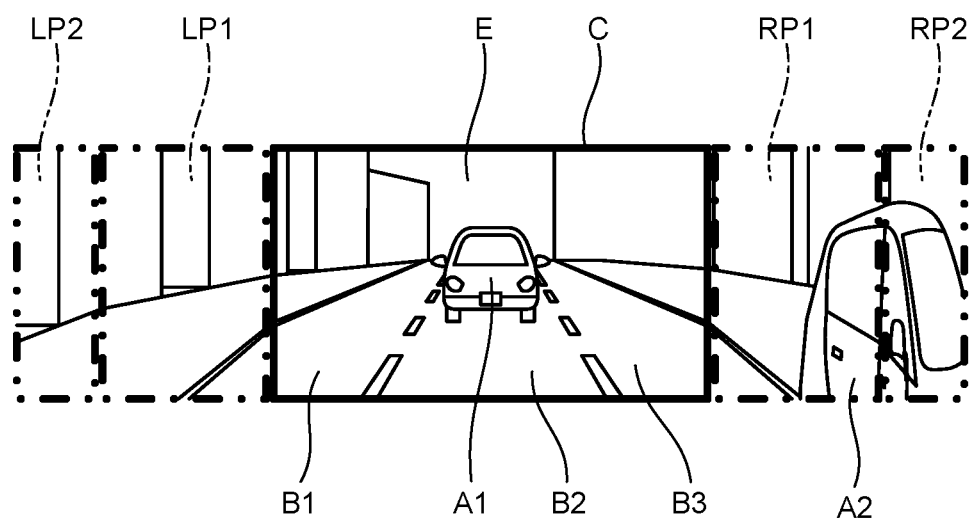
FIG. 9 is a view illustrating an example of a display image according to the first embodiment.

FIG. 9 is an example of the display image displayed on the display device 25 according to the first embodiment. In the example of FIG. 9, the display image W includes a first left compression area LP1, a second left compression area LP2, the essential display area E, a first right compression area RP1, and a second right compression area RP2. The essential display area E is displayed on the display device 25 at the same scale as that in the rear view image D by the display control unit 116.

The first left compression area LP1 is an area obtained by compressing the first left area L1 of the cutout area C in FIG. 8 such that its dimension in the vehicle width direction decreases to half. The second left compression area LP2 is an area obtained by compressing the second left area L2 such that its dimension in the vehicle width direction decreases to quarter.

The first right compression area RP1 is an area obtained by compressing the first right area R1 such that its dimension in the vehicle width direction decreases to half. The second right compression area RP2 is an area obtained by compressing the second right area R2 such that its dimension in the vehicle width direction decreases to quarter. Note that the frames such as the black frame in FIG. 9 are drawn for convenience of description, and no frame is displayed in the actual display image W displayed on the display device 25.

Thus, the second determination unit 114 determines the compression ratio such that the compression ratio in the vehicle width direction gradually increases from the inside of the host vehicle outward in the captured image, thereby, for example, making it possible to display an area closer to the host vehicle at a scale closer to that in the rear view image D, and an area farther away from the host vehicle at a higher compression ratio. Therefore, it is possible to display the display image W without reducing the visibility of the area having high importance for the user while reducing the area serving as the blind spot.

The second determination unit 114 may determine whether to keep the compression ratio fixed or change the compression ratio for each area according to the number of lanes. For example, the second determination unit 114 may keep the compression ratio fixed as illustrated in FIG. 7 when the number of lanes is three or less, and may change the compression ratio in a phased manner as illustrated in FIG. 9 when the number of lanes exceeds three.

Processing of Drive Recorder Unit of First Embodiment

Figure 10:
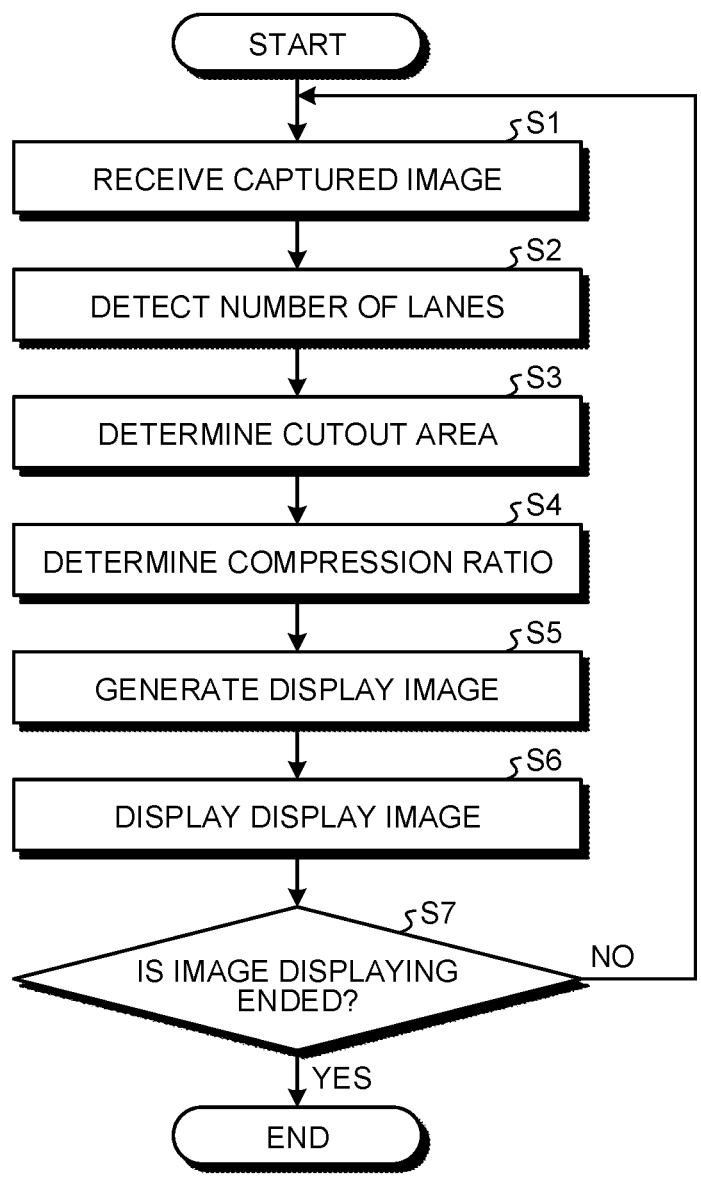
FIG. 10 is a flowchart illustrating an example of processing of the drive recorder unit according to the first embodiment.

Next, processing executed by the drive recorder unit 10 according to the first embodiment will be described. FIG. 10 is a flowchart illustrating an example of the processing executed by the drive recorder unit 10 according to the first embodiment.

First, the receiving unit 111 receives the rear view image generated by the rear camera 32 as the captured image (step S1).

Next, the first detection unit 112 detects the number of lanes based on the rear view image received by the receiving unit 111 (step S2).

Next, the first determination unit 113 determines the essential display area of the rear view image. Then, the first determination unit 113 determines the cutout area centered on the essential display area according to the number of lanes detected by the first detection unit 112 (step S3).

Next, the second determination unit 114 determines the compression ratio for the compression target area in the cutout area according to the number of lanes detected by the first detection unit 112 (step S4).

Next, the generation unit 115 cuts out the cutout area determined by the first determination unit 113 from the rear view image. Then, the generation unit 115 performs the processing of compressing the compression target area in the cutout area in the vehicle width direction according to the compression ratio determined by the second determination unit 114, and generates a display screen to be displayed on the display device 25 (step S5).

Next, the display control unit 116 performs control to display the display image generated by the generation unit 115 on the display device 25 (step S6).

Next, the display control unit 116 determines whether or not to end displaying of the display image (step S7). For example, the display control unit 116 determines to end the displaying when a predetermined time has elapsed since a power source such as an engine of the vehicle 5 is stopped.

When the displaying of the display image is not ended (step S7: No), the processing proceeds to step S1. On the other hand, when ending the displaying of the display image (step S7: Yes), the display control unit 116 ends the processing.

Effects of Drive Recorder Unit According to First Embodiment

Next, effects of the drive recorder unit 10 according to the first embodiment will be described. The drive recorder unit 10 according to the present embodiment determines the processing conditions on the area other than the above-described essential display area in the captured image obtained by imaging the surroundings of the host vehicle according to the number of lanes indicating the number of one or more lanes including the lane on which the host vehicle travels.

More specifically, in the present embodiment, the second determination unit 114 determines the processing conditions so as to increase the compression ratio in proportion to the number of lanes. Therefore, the compression ratio decreases as the number of lanes is smaller. This can prevent a situation in which the captured image is compressed at a high compression ratio even when the number of lanes is small, which makes it difficult to view a vehicle laterally behind. That is, the drive recorder unit 10 according to the present embodiment can make it easier to view a vehicle or the like present laterally behind.

The "lane" includes a sidewalk. Therefore, the user can check the behavior of a pedestrian laterally behind by viewing the display device 25.

Second Embodiment

Next, a drive recorder unit 10 according to the second embodiment will be described.

The drive recorder unit 10 according to the second embodiment is different from the drive recorder unit 10 according to the first embodiment in that the drive recorder unit 10 according to the second embodiment includes a second detection unit 117 as a functional unit. Hereinafter, the drive recorder unit 10 according to the second embodiment will be described with reference to FIGS. 11 to 17. The same configurations and operations as those described in the first embodiment are denoted by the same reference numerals, and the description thereof will be omitted or simplified.

Functional Configuration of Drive Recorder Unit of Second Embodiment

Figure 11:
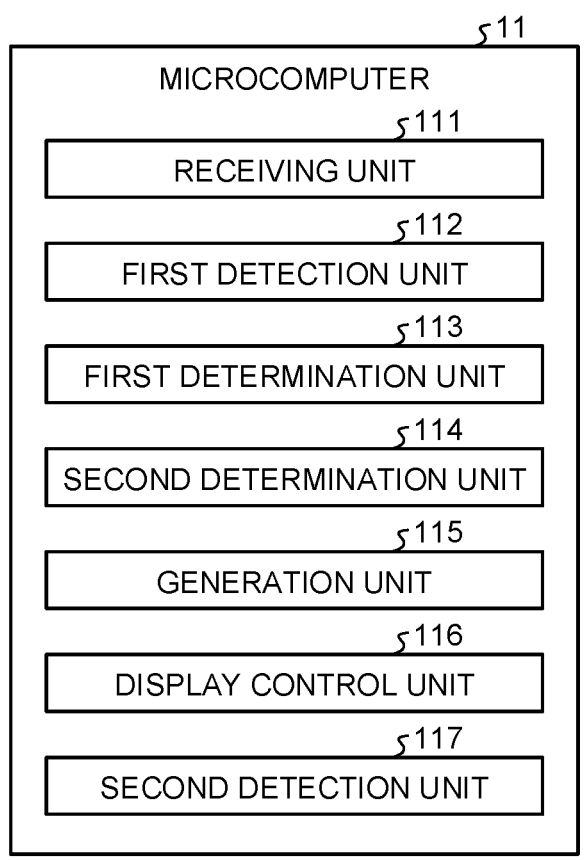
FIG. 11 is a functional block diagram illustrating an example of a functional configuration of a microcomputer of a drive recorder unit according to a second embodiment.

A functional configuration of the drive recorder unit 10 according to the second embodiment will be described with reference to FIG. 11. FIG. 11 is a functional block diagram illustrating an example of the functional configuration of the microcomputer 11 of the drive recorder unit 10 according to the second embodiment.

The drive recorder unit 10 according to the second embodiment further includes the second detection unit 117 in addition to the functional units included in the drive recorder unit 10 according to the first embodiment.

The second detection unit 117 detects the traveling position of the host vehicle. The second detection unit 117 is an example of the detection unit. Specifically, the second detection unit 117 detects a lane change line, a boundary between a roadway and a sidewalk, and the like from the rear view image received by the receiving unit 111, and detects the traveling position of the host vehicle from a positional relationship between the detected lane change line, boundary, and the like in the rear view image.

Although, in the present embodiment, the second detection unit 117 detects the traveling position of the host vehicle from the captured image received by the receiving unit 111, the second detection unit 117 may detect the traveling position of the host vehicle based on the reception result of a positioning signal. In addition, the second detection unit 117 may perform vehicle-to-roadside-infrastructure communication with a device installed on the road, and detect the traveling position of the host vehicle based on the communication result or the like. The communication result includes, for example, the communication speed and the signal strength.

The second detection unit 117 may also function as the above-described first detection unit 112. Alternatively, the first detection unit 112 may also function as the second detection unit 117.

Figure 12:
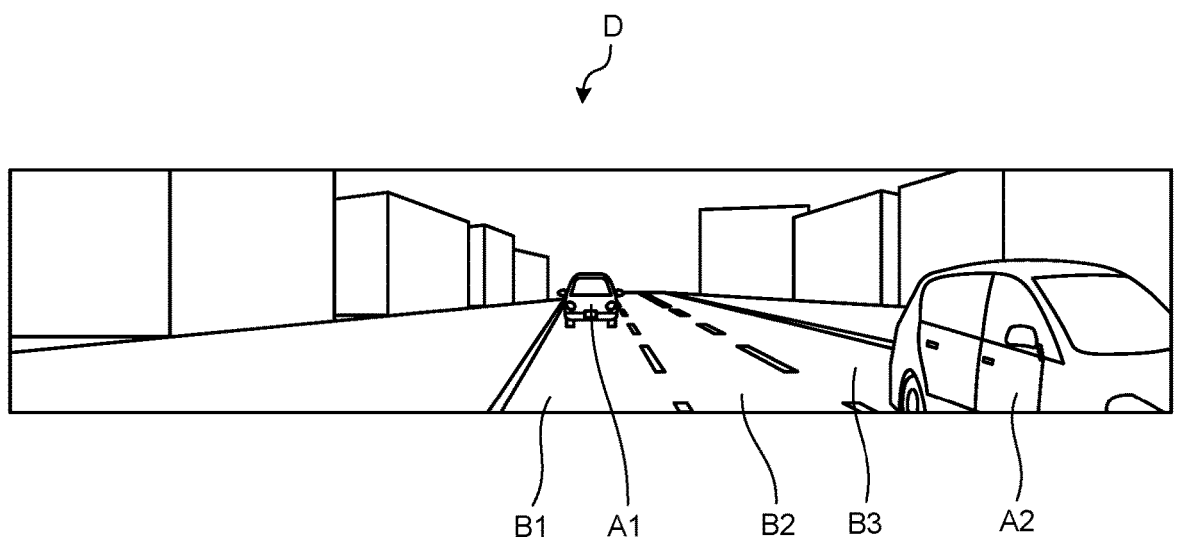
FIG. 12 is a view illustrating an example of a rear view image of a host vehicle according to the second embodiment.

FIG. 12 is a view illustrating an example of a rear view image of the host vehicle captured by the rear camera 32 according to the second embodiment. In the rear view image D illustrated in FIG. 12, the vehicle A1, the vehicle A2, the lane B1, the lane B2, and the lane B3 are drawn. In this example, the rear view image D is an image obtained by imaging the area behind the host vehicle traveling in the lane B1 using the wide-angle rear camera 32. The vehicle A1 is traveling in the lane B1 as the host vehicle does, and the vehicle A2 is traveling in the lane B3.

In the example of FIG. 12, the second detection unit 117 detects that the traveling position of the host vehicle is "the leftmost lane in the image" from the positional relationship between the lane B1, lane B2, and lane B3 in the rear view image D. The leftmost lane in the image is the lane B1.

The first determination unit 113 determines the cutout area according to the number of lanes detected by the first detection unit 112 and the traveling position of the host vehicle detected by the second detection unit 117.

Specifically, the first determination unit 113 performs the same processing as that of the first embodiment and determines the size of the cutout area. Next, the first determination unit 113 determines a cutout method for the cutout area according to the traveling position of the host vehicle detected by the second detection unit 117.

For example, in a case where a lane or sidewalk is not present to the left of the host vehicle, the importance level of information on the left of the host vehicle decreases. In this case, the first determination unit 113 determines the cutout method such that the left end of the essential display area coincides with the left end of the cutout area.

Figure 13:
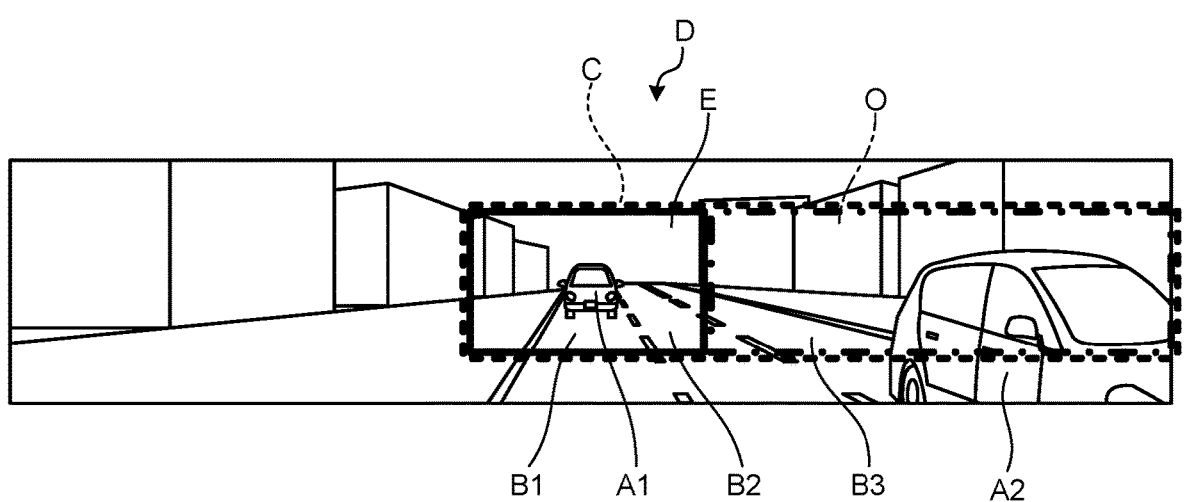
FIG. 13 is an image view illustrating an example of processing of determining a cutout area according to the second embodiment.

FIG. 13 is an image view illustrating an example of processing of determining the cutout area according to the second embodiment. As illustrated in FIG. 13, the first determination unit 113 determines the cutout method such that the left end of the essential display area E coincides with the left end of the cutout area C according to the fact that the traveling position of the host vehicle detected by the second detection unit 117 is the "leftmost lane in the image".

In the example of FIG. 13, the cutout area C includes the essential display area E and a compression target area O located to the right of the essential display area E in the image.

The second determination unit 114 determines processing conditions for the area other than the essential display area in the captured image according to the number of lanes detected by the first detection unit 112 and the traveling position of the host vehicle detected by the second detection unit 117.

For example, the second determination unit 114 determines a compression method for the compression target area in the cutout area based on a table that associates the number of lanes detected by the first detection unit 112 and the traveling position detected by the second detection unit 117 with the compression method including the compression ratio.

For example, the traveling position is represented by a numerical value such as "1" for the leftmost lane or sidewalk that can be confirmed in the captured image, and "2" for its right lane. In addition, the compression method represents, for example, the compression ratio of the area to the left of the essential display area, and the compression ratio of the area to the right of the essential display area. In addition to this, the compression method may include the determination on whether or not to change the compression ratio in a phased manner.

For example, when the host vehicle is traveling in the leftmost lane, the second determination unit 114 increases the compression ratio of the area to the left of the essential display area and decreases the compression ratio of the right area. Note that the second determination unit 114 may determine the compression ratio for the right or the left as "not displayed". The display device 25 does not display the area for which the compression ratio is determined as "non-displayed" by the second determination unit 114. Determining the compression ratio of the area on the right or left as "not displayed" can be translated as compressing the area on the right or left at an infinite compression ratio.

In the example of FIG. 13, the second determination unit 114 determines the compression method corresponding to the number of lanes "3" detected by the first detection unit 112 and the traveling position "1" detected by the second detection unit 117 as the compression method for the compression target area O. For example, the second determination unit 114 determines the left of the essential display area E as being non-displayed and the right of the essential display area E as being compressed such that its dimension in the vehicle width direction decreases to half. The traveling position "1" is the leftmost lane in the image as described above.

Figure 14:
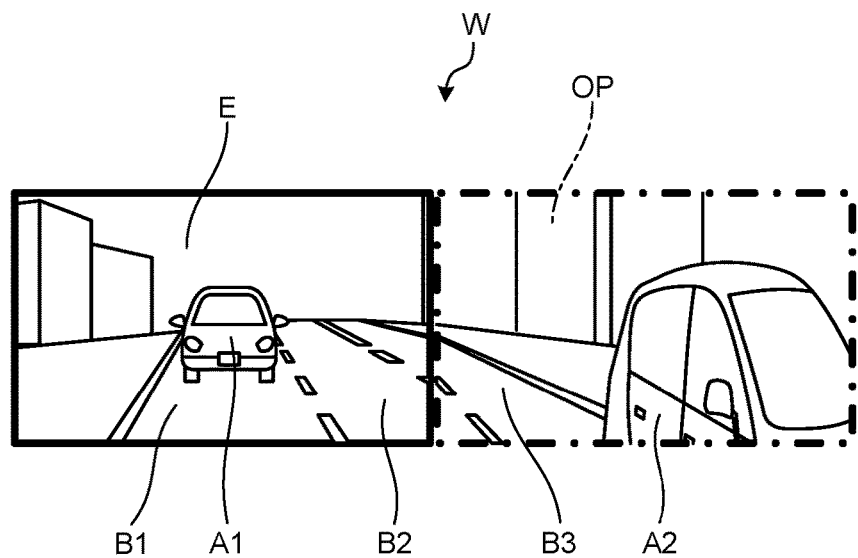
FIG. 14 is a view illustrating an example of a display image according to the second embodiment.

Since processing of the generation unit 115 and the display control unit 116 is the same as that of the first embodiment, description thereof is omitted. FIG. 14 is an example of the display image displayed on the display device 25 according to the second embodiment. In the example of FIG. 14, the display image W includes the essential display area E and a compressed display area OP. The essential display area E is displayed on the display device 25 at the same scale as that in the rear view image D by the display control unit 116.

The compressed display area OP is an area obtained by compressing the compression target area O on the right side of the cutout area C in FIG. 13 such that its dimension in the vehicle width direction decreases to half. Note that the frames such as the black frame in FIG. 13 are drawn for convenience of description, and no frame is displayed in the actual display image W displayed on the display device 25.

Although, in the above example, the second determination unit 114 compresses the compression target area of the cutout area C at the fixed compression ratio to decrease its dimension in the vehicle width direction to half, the compression ratio may vary depending on the position in the compression area, similar to the first embodiment. For example, the second determination unit 114 may determine the compression ratio such that the compression ratio of the compression area increases in a phased manner from the center of the cutout area C outward.

Figure 15:
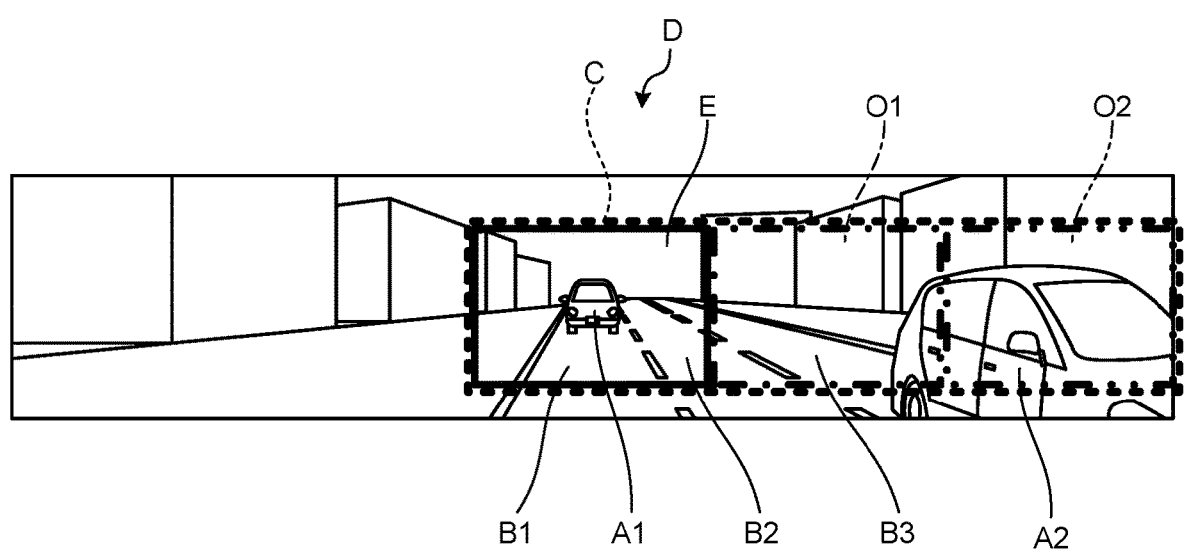
FIG. 15 is an image view illustrating an example of a cutout area before compression in a case where a compression ratio is changed depending on a position in a compression area according to the second embodiment.

FIG. 15 is an image view illustrating an example of the cutout area before compression in a case where the compression ratio is changed depending on the position in the compression area according to the second embodiment. In the example of FIG. 15, the cutout area C includes the essential display area E, a first compression target area O1, and a second compression target area O2. The first detection unit 112, the second detection unit 117, and the first determination unit 113 perform the same processing as that described with reference to FIG. 13.

The second determination unit 114 determines the compression method corresponding to the number of lanes "3" detected by the first detection unit 112 and the traveling position "1" detected by the second detection unit 117. For example, the second determination unit 114 determines to compress the first compression target area O1 such that its dimension in the vehicle width direction decrease to half and the second compression target area O2 such that its dimension in the vehicle width direction decrease to quarter.

The generation unit 115 cuts out the cutout area C according to the determination of the first determination unit 113. Then, the generation unit 115 performs the compression processing according to the compression method determined by the second determination unit 114 by compressing the first compression target area O1 of the cutout area C such that its dimension in the vehicle width direction decrease to half and by compressing the second compression target area O2 such that its dimension in the vehicle width direction decrease to quarter. The generation unit 115 then generates the display image W to be displayed on the display device 25. The display control unit 116 displays the display image W generated by the generation unit 115 on the display device 25.

Figure 16:
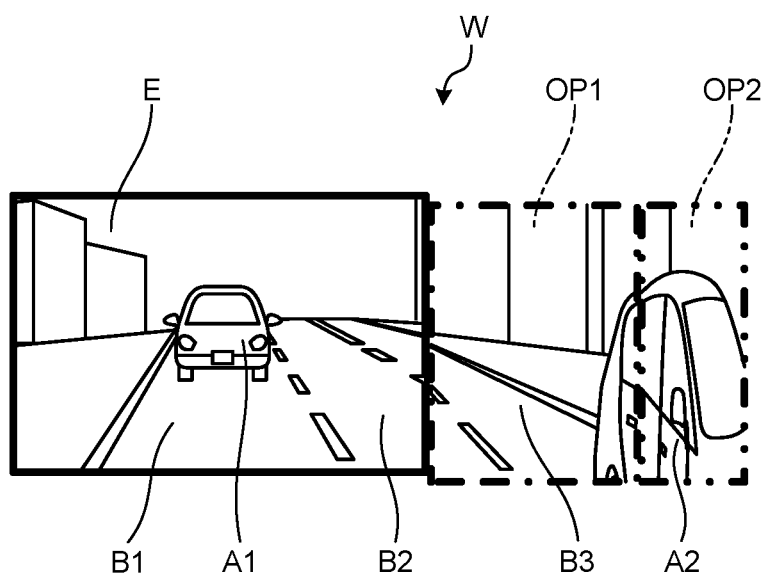
FIG. 16 is a view illustrating an example of a display image according to the second embodiment.

FIG. 16 is an example of the display image displayed on the display device 25. In the example of FIG. 16, the display image W includes the essential display area E, a first compressed display area OP1, and a second compressed display area OP2. The essential display area E is displayed on the display device 25 at the same scale as that in the rear view image D by the display control unit 116.

The first compressed display area OP1 is an area obtained by compressing the first compression target area O1 of the cutout area C in FIG. 15 such that its dimension in the vehicle width direction decrease to half. The second compressed display area OP2 is an area obtained by compressing the second compression target area O2 such that its dimension in the vehicle width direction decrease to quarter. Note that the frames such as the black frame in FIG. 15 are drawn for convenience of description, and no frame is displayed in the actual display image W displayed on the display device 25.

The second determination unit 114 may determine the compression method for each area according to the number of lanes and the traveling position. For example, the second determination unit 114 may make the compression ratio uniform as illustrated in FIG. 14 when the number of lanes is three or less, and may change the compression ratio in a phased manner as illustrated in FIG. 16 when the number of lanes exceeds three.

In addition, the second determination unit 114 may change the compression method between the left and the right of the essential display area according to the traveling position. For example, in a case where the area to the right of the essential display area is larger than the area to the left of the essential display area in the cutout area, the second determination unit 114 may determine the compression ratio such that the compression ratio of the right area is higher than the compression ratio of the left area. For example, the second determination unit 114 may determine to compress the left area such that its dimension in the vehicle width direction decrease to half, compress a part closer to the essential display area in the right area such that its dimension in the vehicle width direction decrease to half, and compress another part farther away from the essential display area in the right area such that its dimension in the vehicle width direction decrease to quarter.

Processing of Drive Recorder Unit of Second Embodiment

Figure 17:
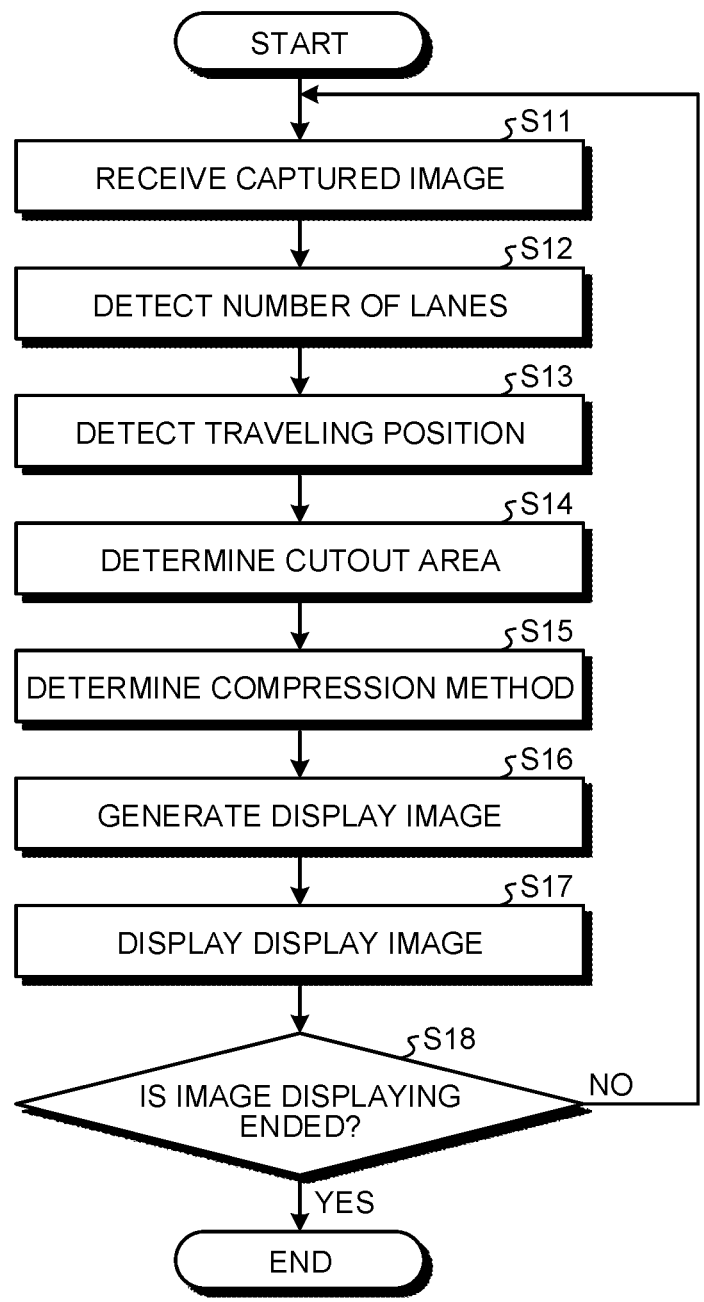
FIG. 17 is a flowchart illustrating an example of processing of the drive recorder unit according to the second embodiment.

Next, processing executed by the drive recorder unit 10 according to the second embodiment will be described. FIG. 17 is a flowchart illustrating an example of the processing executed by the drive recorder unit 10 according to the second embodiment.

First, the receiving unit 111 receives the rear view image generated by the rear camera 32 as the captured image (step S11).

Next, the first detection unit 112 detects the number of lanes based on the rear view image received by the receiving unit 111 (step S12).

Next, the second detection unit 117 detects the traveling position based on the rear view image received by the receiving unit 111 (step S13).

Next, the first determination unit 113 determines the essential display area of the rear view image. Then, the first determination unit 113 determines the size of the cutout area and the cutout method according to the number of lanes detected by the first detection unit 112 and the traveling position detected by the second detection unit 117 (step S14).

Next, the second determination unit 114 determines the compression method for the compression target area according to the number of lanes detected by the first detection unit 112 and the traveling position (step S15).

Next, the generation unit 115 cuts out the cutout area determined by the first determination unit 113 from the rear view image. Then, the generation unit 115 performs the processing of compressing the compression target area in the vehicle width direction according to the compression method determined by the second determination unit 114, and generates a display screen to be displayed on the display device 25 (step S16).

Next, the display control unit 116 performs control to display the display image generated by the generation unit 115 on the display device 25 (step S17).

Next, the display control unit 116 determines whether or not to end displaying of the display image (step S18). For example, the display control unit 116 determines to end the displaying when a predetermined time has elapsed since a power source such as an engine of the vehicle 5 is stopped.

When the displaying of the display image is not ended (step S18: No), the processing proceeds to step S11. On the other hand, when ending the displaying of the display image (step S18: Yes), the display control unit 116 ends the processing.

Effects of Drive Recorder Unit According to Second Embodiment

Next, effects of the drive recorder unit 10 according to the second embodiment will be described. The drive recorder unit 10 according to the present embodiment determines processing conditions for the area other than the essential display area according to the traveling position of the host vehicle.

More specifically, in the present embodiment, the second determination unit 114 increases the compression ratio of the area to the left of the essential display area and decreases the compression ratio of the area to the right when the host vehicle is traveling in the leftmost lane. This is because when the host vehicle is traveling in the leftmost lane, no vehicle or the like is present to the left of the host vehicle, and thus it is less necessary to pay attention to the left of the host vehicle. On the other hand, since a vehicle or the like may be present to the right of the host vehicle, it is highly necessary to pay attention to the right.

Therefore, the drive recorder unit 10 according to the present embodiment can display only a portion having a high importance level with a low compression ratio, which allows makes it easier to view the portion. That is, it is possible to make it easier to view any vehicle or the like present laterally behind.

The above-described embodiments can be appropriately modified and implemented by changing a part of the configuration or function of the display control system 1. Hereinafter, some modifications according to the above-described embodiments will be described as other embodiments. In the following description, points different from the above-described embodiments will be mainly described, and detailed description of points common to the contents already described will be omitted. In addition, the modifications described below may be implemented individually, or may be implemented in appropriate combination.

First Modification

In the first embodiment and the second embodiment described above, the mode has been described in which the display control system 1 includes the drive recorder unit 10, the display unit 20, the front camera 31, the rear camera 32, and the display unit 40. However, the display control system 1 may only include the display unit 20 and the rear camera 32.

In this case, the ECU 21 of the display unit 20 loads the control program stored in the ROM of the ECU 21 in the RAM and causes the CPU to operate, thereby implementing each functional unit. The ECU 21 implements, for example, the receiving unit 111, the first detection unit 112, the first determination unit 113, the second determination unit 114, the generation unit 115, and the display control unit 116 included in the microcomputer 11 as each functional unit.

Second Modification

In the first embodiment and the second embodiment described above, the mode has been described in which the rear view image subjected to compression processing is displayed on the display device 25. However, the display control unit 116 may perform control to display the rear view image subjected to the compression processing on the display 45. Alternatively, the display control unit 116 may perform control to display the rear view image subjected to the compression processing on a head-up display (HUD) or the like mounted on the vehicle 5.

Third Modification

In the first embodiment and the second embodiment described above, the mode has been described in which only the rear view image is displayed on the display device 25. However, an image in which the front view image is combined may be displayed on the display device 25.

In the present modification, for example, the generation unit 115 generates a display image to be displayed on the display device 25 by combining the front left image ahead of the host vehicle cut out from the front view image such that the front left image lies to the left of the rear view image subjected to the compression processing, and the front right image ahead of the host vehicle cut out from the front view image such that the front right image lies to the right of the rear view image subjected to the compression processing.

The generation unit 115 may detect any pedestrian or a bicycle from the front view image, and generate the display image to be displayed on the display device 25 by combining the front view image with the rear view image only when any pedestrian or bicycle is present. Alternatively, the generation unit 115 may generate the display screen by setting only a roadway as the display target for the rear view image, setting only a sidewalk as the display target for the front view image, and combining the rear view image and the front view image.

The generation unit 115 generates the display image by combining the rear view image and the front view image, thereby allowing the user to obtain both rear and front information from one screen. This makes it easier for the user to view the surroundings of the host vehicle, thereby makes it possible to reduce the possibility of occurrence of an accident.

Fourth Modification

In the second embodiment described above, the mode has been described in which the second determination unit 114 determines the compression method for the captured image based on the number of lanes and the traveling position. However, in addition to these, the second determination unit 114 may determine the compression method based on the presence or absence of any vehicle or the like. Here, the vehicle includes a two-wheeled vehicle.

The second determination unit 114 of the present modification increases the compression ratio of an area where no other vehicle or the like is present in the captured image.

Figure 18:
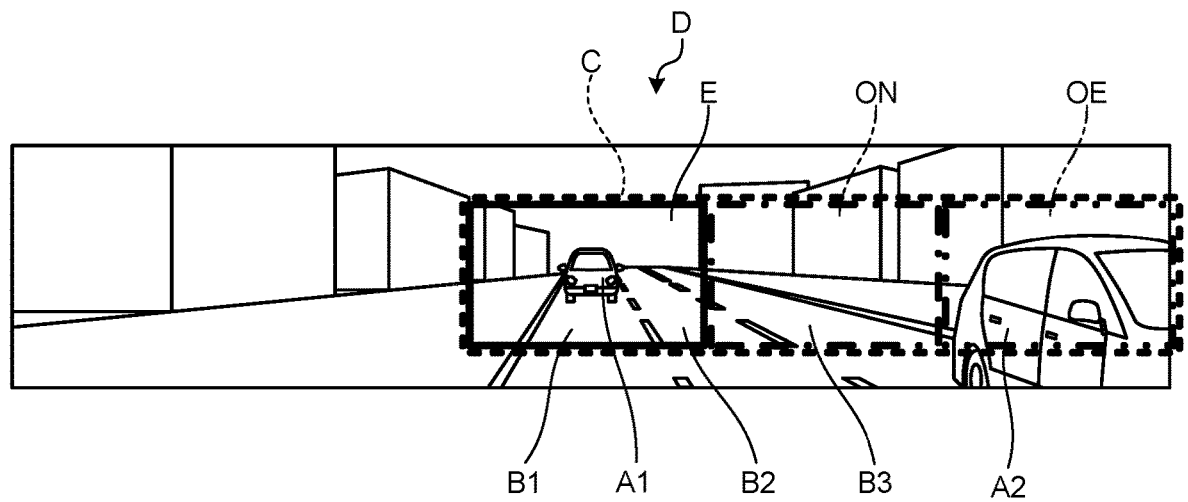
FIG. 18 is a view illustrating an example of a rear view image of a host vehicle according to a fourth modification.

FIG. 18 is a view illustrating an example of a rear view image of a host vehicle according to a fourth modification. In the example of FIG. 18, no vehicle is present in an area ON, and the vehicle A2 is present in an area OE. In this case, the second determination unit 114 increases the compression ratio of the area ON, and sets the compression ratio of the area OE to be lower than that of the area ON.

Figure 19:
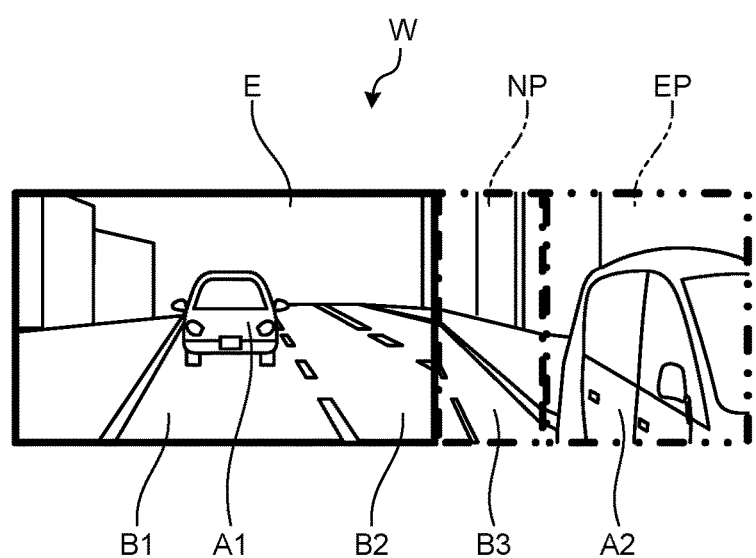
FIG. 19 is a view illustrating an example of a display image according to the fourth modification.

FIG. 19 is an example of the display image to be displayed on the display device 25 according to the fourth modification. In the example of FIG. 19, the display image W includes the essential display area E, a high compression area NP, and a low compression area EP. The essential display area E is displayed on the display device 25 at the same scale as that in the rear view image D by the display control unit 116.

The high compression area NP is an area obtained by compressing the area ON of the cutout area C in FIG. 18 such that its dimension in the vehicle width direction decreases to quarter. The low compression area EP is an area obtained by compressing the area OE of the cutout area C in FIG. 18 such that its dimension in the vehicle width direction decreases to half. Note that the frames such as the black frame in FIG. 19 are drawn for convenience of description, and no frame is displayed in the actual display image W displayed on the display device 25.

Thus, the second determination unit 114 sets the compression ratio to be higher for the area where no vehicle or the like is present and sets the compression ratio to be lower for the area where any vehicle or the like is present, thereby making it easier to view any object present laterally behind to which attention should be paid. Therefore, the drive recorder unit 10 of the present modification can make it easier to view any vehicle or the like present laterally behind.

Fifth Modification

The first determination unit 113 and the second determination unit 114 may determine the processing conditions for the captured image in conjunction with the operation of the direction indicator by the user.

When the user operates the direction indicator, the first determination unit 113 of the present modification determines the cutout area according to the user's operation. For example, the first determination unit 113 defines in advance the size of the cutout area and the cutout method for a case when the direction indicator indicates the left and the size of the cutout area and the cutout method for a case when the direction indicator indicates the right, and determines the cutout area according to the user's operation.

The second determination unit 114 determines the compression ratio of the compression target area in conjunction with the operation of the direction indicator by the user. For example, the second determination unit 114 determines the processing conditions such that the compression ratio of the area in the direction indicated by the direction indicator decreases with reference to the essential display area.

Here, a case will be considered where the user operates the direction indicator to indicate the right to change to the right lane in a state where the display image W in FIG. 7 is displayed on the display device 25. In this case, the first determination unit 113 determines the size of the cutout area and the cutout method for a case when the direction indicator indicates the right. In this example, the first determination unit 113 determines the essential display area E and the right area R in FIG. 6 as the cutout area C.

Next, the second determination unit 114 decreases the compression ratio in the direction indicated by the direction indicator in the image. In this example, the second determination unit 114 decreases the compression ratio of the right area R in FIG. 6 and determines no compression.

Figure 20:
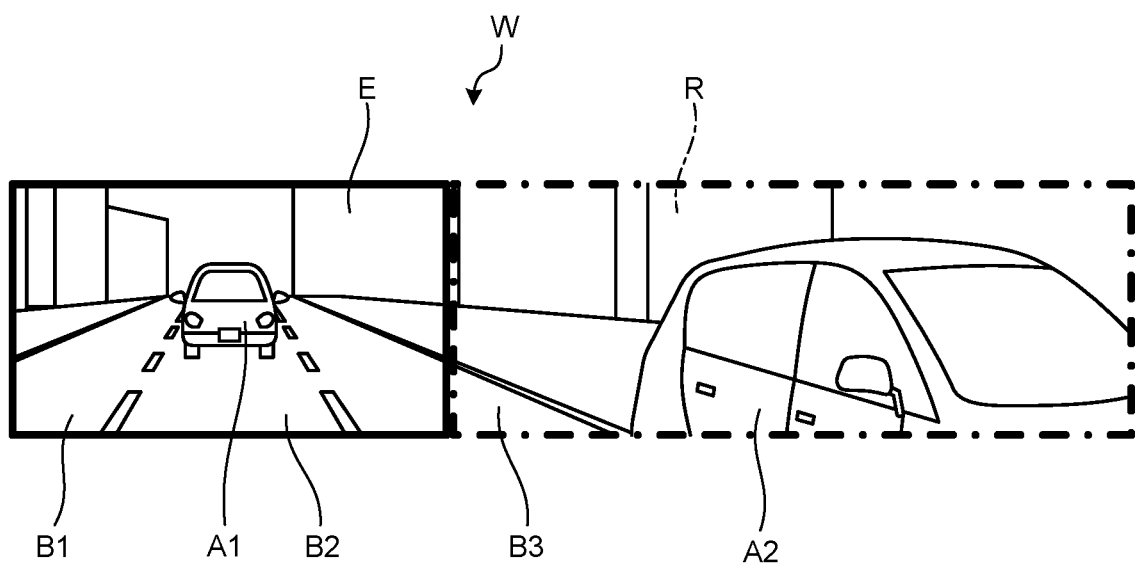
FIG. 20 is a view illustrating an example of a display image according to a fifth modification.

FIG. 20 is a view illustrating an example of the display image to be displayed on the display device 25 according to the fifth modification. In the example of FIG. 20, the display image W includes the essential display area E and the right area R. The essential display area E and the right area R are displayed on the display device 25 at the same scale as that in the rear view image D by the display control unit 116. Note that the frames such as the black frame in FIG. 20 are drawn for convenience of description, and no frame is displayed in the actual display image W displayed on the display device 25.

Thus, the second determination unit 114 decreases the compression ratio in the direction indicated by the direction indicator in the image, thereby, for example, making it easier for the user to view the right rear area when turning right or changing to the right lane. That is, according to the present modification, it is possible to make it easier to view any vehicle or the like present laterally behind.

Sixth Modification

The first determination unit 113 and the second determination unit 114 may determine the processing conditions for the captured image in conjunction with the operation of the steering wheel by the user.

When the user operates the steering wheel, the first determination unit 113 of the present modification determines the cutout area according to the user's operation. For example, the first determination unit 113 defines in advance the size of the cutout area and the cutout method for a case when the steering wheel is turned to the left and the size of the cutout area and the cutout method for a case when the steering wheel is turned to the right, and determines the cutout area according to the user's operation.

The determination on whether the steering wheel is turned to the left or the right is made based on, for example, whether the steering angle exceeds a threshold value.

The second determination unit 114 determines the compression ratio of the compression target area in conjunction with the operation of the steering wheel by the user. For example, the second determination unit 114 determines the processing conditions such that the compression ratio of the area in the direction to which the steering wheel is turned decreases with reference to the essential display area.

Here, a case will be considered where the user turns the steering wheel right to change to the right lane in a state where the display image W in FIG. 7 is displayed on the display device 25. In this case, the first determination unit 113 determines the size of the cutout area and the cutout method for a case when the steering wheel is turned right. In this example, the first determination unit 113 determines the essential display area E and the right area R in FIG. 6 as the cutout area C.

Next, the second determination unit 114 decreases the compression ratio in the direction to which the steering wheel is turned in the image. In this example, the second determination unit 114 decreases the compression ratio of the right area R in FIG. 6 and determines no compression. Since the image of the display image is the same as that of the fifth modification, illustration and description thereof are omitted.

Thus, the second determination unit 114 decreases the compression ratio in the direction to which the steering wheel is turned in the image, thereby, for example, making it easier for the user to view the right rear area when turning right or changing to the right lane. That is, according to the present modification, it is possible to make it easier to view any vehicle or the like present laterally behind.

Seventh Modification

The first determination unit 113 and the second determination unit 114 may determine the processing conditions for the captured image in conjunction with the movement of the line of sight of the user.

When the user moves his/her line of sight, the first determination unit 113 of the present modification determines the cutout area according to the movement of the user's line of sight. For example, the first determination unit 113 defines in advance the size of the cutout area and the cutout method for a case when the user directs his/her line of sight to the left and the size of the cutout area and the cutout method for a case when the user directs his/her line of sight to the right, and determines the cutout area according to the movement of the user's line of sight.

The movement of the user's line of sight is detected by, for example, providing a camera or the like capable of imaging the user in the vehicle 5 and analyzing the image captured by the camera. The user is, for example, a driver.

The second determination unit 114 determines the compression ratio of the compression target area in conjunction with the movement of the user's line of sight. For example, the second determination unit 114 determines the processing conditions such that the compression ratio of the area in the direction to which the line of sight is directed decreases with reference to the essential display area.

Here, a case will be considered where the user directs his/her line of sight right to change to the right lane in a state where the display image W in FIG. 7 is displayed on the display device 25. In this case, the first determination unit 113 determines the size of the cutout area and the cutout method for a case when the user directs his/her line of sight to the right. In this example, the first determination unit 113 determines the essential display area E and the right area R in FIG. 6 as the cutout area C.

Next, the second determination unit 114 decreases the compression ratio in the direction to which the user's line of sight is directed in the image. In this example, the second determination unit 114 decreases the compression ratio of the right area R in FIG. 6 and determines no compression. Since the image of the display image is the same as that of the fifth modification, illustration and description thereof are omitted.

Thus, the second determination unit 114 decreases the compression ratio in the direction to which the user's line of sight is directed in the image, thereby, for example, making it easier for the user to view the right rear area when turning right or changing to the right lane. That is, according to the present modification, it is possible to make it easier to view any vehicle or the like present laterally behind.

Eighth Modification

The first determination unit 113 and the second determination unit 114 may determine the processing conditions for the captured image in conjunction with a route guidance.

The first determination unit 113 of the present modification determines the cutout area according to the route guidance. For example, the first determination unit 113 defines in advance the size of the cutout area and the cutout method for a case when guiding to turn left and the size of the cutout area and the cutout method for a case when guiding to turn right, and determines the cutout area according to the route guidance.

The route guidance is to identify the current position and the traveling direction of the host vehicle, for example, by analyzing a positioning signal, and guide a route to a destination.

The second determination unit 114 determines the compression ratio of the compression target area according to the route guidance. For example, the second determination unit 114 determines the processing conditions such that the compression ratio of the area in the direction indicated by the route guide decreases with reference to the essential display area.

Here, a case will be considered where it is guided by the route guide to turn right in a state where the display image W of FIG. 7 is displayed on the display device 25. In this case, the first determination unit 113 determines the size of the cutout area and the cutout method for a case when guiding to turn right. In this example, the first determination unit 113 determines the essential display area E and the right area R in FIG. 6 as the cutout area C.

Next, the second determination unit 114 decreases the compression ratio in the direction indicated by the route guide in the image. In this example, the second determination unit 114 decreases the compression ratio of the right area R in FIG. 6 and determines no compression. Since the image of the display image is the same as that of the fifth modification, illustration and description thereof are omitted.

Thus, the second determination unit 114 decreases the compression ratio in the direction indicated by the route guide in the image, thereby allowing the user to check the situation occurring laterally behind from a display image with less discomfort before operating the direction indicator. That is, according to the present modification, it is possible to make it easier to view any vehicle or the like present laterally behind.

Ninth Modification

The first determination unit 113 and the second determination unit 114 may determine the processing conditions for the captured image according to the traveling speed of the host vehicle.

In the present modification, when the speed of the host vehicle falls below a predefined threshold, the first determination unit 113 determines a predefined area in the captured image as the cutout area regardless of the number of lanes and the traveling position. When the traveling speed of the host vehicle falls below the predefined threshold, the second determination unit 114 sets the compression ratio of the compression target area to 0. The compression ratio of 0 means no compression.

In addition, the user may manually switch whether the first determination unit 113 and the second determination unit 114 perform the processing of determining the processing conditions for the captured image based on the number of lanes and the traveling position, or perform the above-described processing.

According to the drive recorder unit 10 according to the present modification, it is possible to display an uncompressed natural display image on the display device 25 in a scene where it is less necessary to pay attention to laterally behind, such as when the host vehicle is stopped. This makes it possible to reduce a scene where the user feels uncomfortable about the display image.

Tenth Modification

The first determination unit 113 and the second determination unit 114 may determine the processing conditions for the captured image according to the inter-vehicle distance.

In the present modification, when the inter-vehicle distance exceeds a predefined threshold, the first determination unit 113 determines a predefined area in the captured image as the cutout area regardless of the number of lanes and the traveling position. When the inter-vehicle distance exceeds the predefined threshold, the second determination unit 114 sets the compression ratio of the compression target area to 0. The compression ratio of 0 means no compression.

The inter-vehicle distance between the host vehicle and another vehicle is calculated by analyzing the rear view image D.

With the drive recorder unit 10 according to the present modification, it is possible to display an uncompressed natural display image on the display device 25 in a scene where it is less necessary to pay attention to laterally behind, such as when the inter-vehicle distance exceeds a certain distance. This makes it possible to reduce a scene where the user feels uncomfortable about the display image.

Eleventh Modification

In the fourth modification described above, the mode has been described in which the second determination unit 114 decreases the compression ratio of the area where any vehicle or the like is present. However, the second determination unit 114 may decrease the compression ratio of the area for a lane where an entrance of a service area or the like is present. Here, the service area or the like includes, for example, a service area and a parking area.

The second determination unit 114 of the present modification decreases the compression ratio of the area for the lane where the entrance of the service area or the like is present in the captured image. The lane where the entrance of the service area or the like is present may be detected by analyzing the captured image, or may be detected from the reception result of a positioning signal or the like. In addition, the second determination unit 114 may perform the above processing only when a certain period of time has elapsed from the start of driving or the previous break.

Thus, decreasing the compression ratio of the area for the lane where the entrance of the service area or the like is present makes it easier for the user to check an area laterally behind when changing the lane to the lane where the entrance of the service area or the like is present to enter the service area or the like.

Although the embodiments of the present disclosure have been described above, the above-described embodiments are presented as examples, and are not intended to limit the scope of the invention. These novel embodiments can be implemented in various other forms, and various omissions, substitutions, and changes can be made without departing from the gist of the invention. These novel embodiments and modifications thereof are included in the scope and gist of the invention, and are included in the invention described in the claims and the equivalent scope thereof. Furthermore, the components of different embodiments and modifications may be appropriately combined.

Furthermore, the effects of each embodiment described herein are merely examples and are not limited, and other effects may be provided.

According to the present disclosure, it is possible to make it easier to view any vehicle or the like present laterally behind. Note that the effect described here is not necessarily limited, and may be any of the effects described in the description.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display control device, comprising:
   a memory that stores a program; and
   a processor that is connected to the memory, wherein the processor performs first processing by executing the program, the first processing including:
      detecting a number of lanes indicating one or more lanes, the lanes including a first lane on which a host vehicle travels;
      determining a processing condition for an area, other than an essential display area including a predefined display area, from a captured image, obtained by imaging surroundings of the host vehicle, according to the number of lanes detected;
      second processing of the captured image according to the processing condition determined; and
      displaying the processed captured image on a display device,
   wherein the determining of the processing condition includes determining a compression ratio in a vehicle width direction of the area other than the essential display area, and
   the processor determines the compression ratio in the vehicle width direction of the area other than the essential display area such that the compression ratio is higher as the number of lanes detected is larger and is lower as the number of lanes detected is smaller.

2. The display control device according to claim 1, wherein the lanes include a sidewalk on which a pedestrian walks and the first lane on which the host vehicle travels.

3. The display control device according to claim 1, wherein the first processing includes
   detecting a traveling position of the host vehicle, and
   determining the processing condition for the area in the captured image according to the number of lanes and the traveling position of the host vehicle detected.

4. The display control device according to claim 3, wherein the first processing determines the processing condition such that the compression ratio in the vehicle width direction gradually increases from inside of the host vehicle outward in the captured image.

5. The display control device according to claim 3, wherein the first processing determines the processing condition such that the compression ratio in the vehicle width direction increases in an area where any other vehicle is not present in the captured image.

6. The display control device according to claim 3, wherein the first processing determines the processing condition, including the determining of the compression ratio in the vehicle width direction of the area, in conjunction with an operation of a direction indicator by a user.

7. The display control device according to claim 6, wherein the first processing determines the processing condition such that the compression ratio in the vehicle width direction of a second area in a direction indicated by the direction indicator decreases with reference to the essential display area.

8. The display control device according to claim 3, wherein the first processing determines the processing condition, including the determining of the compression ratio in the vehicle width direction of the area, in conjunction with an operation of a steering wheel by a user.

9. The display control device according to claim 8, wherein the first processing determines the processing condition such that the compression ratio in the vehicle width direction of a second area in a direction in which the steering wheel is turned decreases with reference to the essential display area.

10. The display control device according to claim 3, wherein the first processing determines the processing condition, including the determining of the compression ratio in the vehicle width direction of the area, in conjunction with movement of a line of sight of a user.

11. The display control device according to claim 10, wherein the first processing determines the processing condition such that the compression ratio in the vehicle width direction of a second area in a direction in which the line of sight is directed decreases with reference to the essential display area.

12. The display control device according to claim 3, wherein the first processing determines the processing condition, including the determining of the compression ratio in the vehicle width direction of the area, according to a route guide.

13. The display control device according to claim 12, wherein the first processing determines the processing condition such that the compression ratio in the vehicle width direction of a second area in a direction indicated by the route guide decreases with reference to the essential display area.

14. The display control device according to claim 3, wherein the first processing determines the processing condition such that the compression ratio in the vehicle width direction is 0 when a traveling speed of the host vehicle is below a predefined threshold.

15. A display control device, comprising:
a memory that stores a program; and
a processor that is connected to the memory, wherein the processor performs processing by executing the program, the processing including:
detecting a number of lanes indicating one or more lanes, the lanes including a first lane on which a host vehicle travels;
determining a processing condition for an area, other than an essential display area including a predefined display area, from a captured image, obtained by imaging surroundings of the host vehicle, according to the number of lanes detected;
processing the captured image according to the processing condition determined; and
displaying the processed captured image on a display device,
wherein the processing of the captured image includes detecting a traveling position of the host vehicle,
determining the processing condition for the area other than the essential display area in the captured image according to the number of lanes and the traveling position of the host vehicle detected, and
determining the processing condition such that a display compression ratio in a vehicle width direction is 0 when an inter-vehicle distance exceeds a predefined threshold.

16. A display control method performed by a display control device, the display control method comprising:
detecting a number of lanes of one or more lanes, the lanes including a first lane on which a host vehicle travels;
determining, by a processor, a processing condition for an area, other than an essential display area including a predefined display area, from a captured image, obtained by imaging surroundings of the host vehicle, according to the number of lanes detected;
processing the captured image according to the processing condition determined; and
displaying the processed captured image on a display device,
wherein the determining of the processing condition by the processor includes determining a compression ratio in a vehicle width direction of the area other than the essential display area, and
the processor determines the compression ratio in the vehicle width direction of the area other than the essential display area such that the compression ratio is higher as the number of lanes detected is larger and is lower as the number of lanes detected is smaller.

* * * * *